United States Patent
Uchigaito

(10) Patent No.: US 10,636,161 B2
(45) Date of Patent: Apr. 28, 2020

(54) IMAGE RECOGNITION SYSTEM

(71) Applicant: Hitachi, Ltd., Chiyoda-ku, Tokyo (JP)

(72) Inventor: Hiroshi Uchigaito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 214 days.

(21) Appl. No.: 15/874,502

(22) Filed: Jan. 18, 2018

(65) Prior Publication Data

US 2018/0240249 A1 Aug. 23, 2018

(30) Foreign Application Priority Data

Feb. 23, 2017 (JP) .................. 2017-031616

(51) Int. Cl.
| | | |
|---|---|---|
| *G06T 7/00* | (2017.01) | |
| *G06T 7/70* | (2017.01) | |
| *H04N 5/262* | (2006.01) | |
| *H04N 5/63* | (2006.01) | |
| *G06K 9/00* | (2006.01) | |
| *G08G 1/16* | (2006.01) | |

(52) U.S. Cl.
CPC ............ *G06T 7/70* (2017.01); *G06K 9/00362* (2013.01); *G06K 9/00805* (2013.01); *H04N 5/2628* (2013.01); *H04N 5/63* (2013.01); *G06T 2207/30252* (2013.01); *G08G 1/165* (2013.01); *G08G 1/166* (2013.01)

(58) Field of Classification Search
None
See application file for complete search history.

(56) References Cited

U.S. PATENT DOCUMENTS

| | | | | |
|---|---|---|---|---|
| 2005/0264557 A1* | 12/2005 | Kise | ................... | G06K 9/00201 345/419 |
| 2007/0094424 A1* | 4/2007 | Uno | ...................... | G06F 13/102 710/62 |
| 2007/0195363 A1* | 8/2007 | Uno | ...................... | G06F 3/0605 358/1.15 |
| 2007/0204055 A1* | 8/2007 | Oishi | ................... | G06F 13/385 709/230 |

(Continued)

FOREIGN PATENT DOCUMENTS

| | | | |
|---|---|---|---|
| JP | 2005-346297 A | | 12/2005 |
| JP | 2007251257 A | * | 9/2007 |

(Continued)

*Primary Examiner* — Delomia L Gilliard
(74) *Attorney, Agent, or Firm* — Crowell & Moring LLP

(57) ABSTRACT

An image recognition system includes an external information detection unit detecting a distance to a target to be recognized included in an image, a reduced image size determination unit deriving a reduced size of the image based on the distance to the target to be recognized, an image reduction unit reducing the image based on the reduced size of the image, and an image recognition unit including a plurality of recognition process units corresponding to sizes of the images to be recognized and executing the recognition process of the target to be recognized included in the reduced image by means of the recognition process unit corresponding to a size of the image. Instead of the distance to the target to be recognized, a size and a shape of the image, or a clip position of the image from an entire image, may be used.

15 Claims, 29 Drawing Sheets

(56) References Cited

U.S. PATENT DOCUMENTS

| | | | | |
|---|---|---|---|---|
| 2011/0142356 A1* | 6/2011 | Uemori | ............... | G02B 21/367 |
| | | | | 382/233 |
| 2011/0199499 A1* | 8/2011 | Tomita | ............... | G06K 9/00268 |
| | | | | 348/222.1 |
| 2013/0070096 A1* | 3/2013 | Muramatsu | .............. | G06K 9/78 |
| | | | | 348/148 |
| 2013/0223689 A1* | 8/2013 | Saito | .................. | G06K 9/00791 |
| | | | | 382/104 |
| 2013/0322691 A1* | 12/2013 | Guan | ................ | G06K 9/00805 |
| | | | | 382/103 |
| 2017/0177955 A1* | 6/2017 | Yokota | ............... | G06K 9/00791 |
| 2017/0220877 A1* | 8/2017 | Kakegawa | .............. | B60R 21/00 |

FOREIGN PATENT DOCUMENTS

| | | |
|---|---|---|
| WO | WO 2010/044214 A1 | 4/2010 |
| WO | WO-2018101247 A1 * | 6/2018 |

\* cited by examiner

| Items | Original size (pixel²) | Ratio |
|---|---|---|
| Object 1 | 900x840 | 1.07 |
| Object 2 | 100x200 | 0.50 |
| Object 3 | 400x180 | 2.22 |
| ... | ... | ... |

Ratio=2

Ratio=1

Ratio=0.5

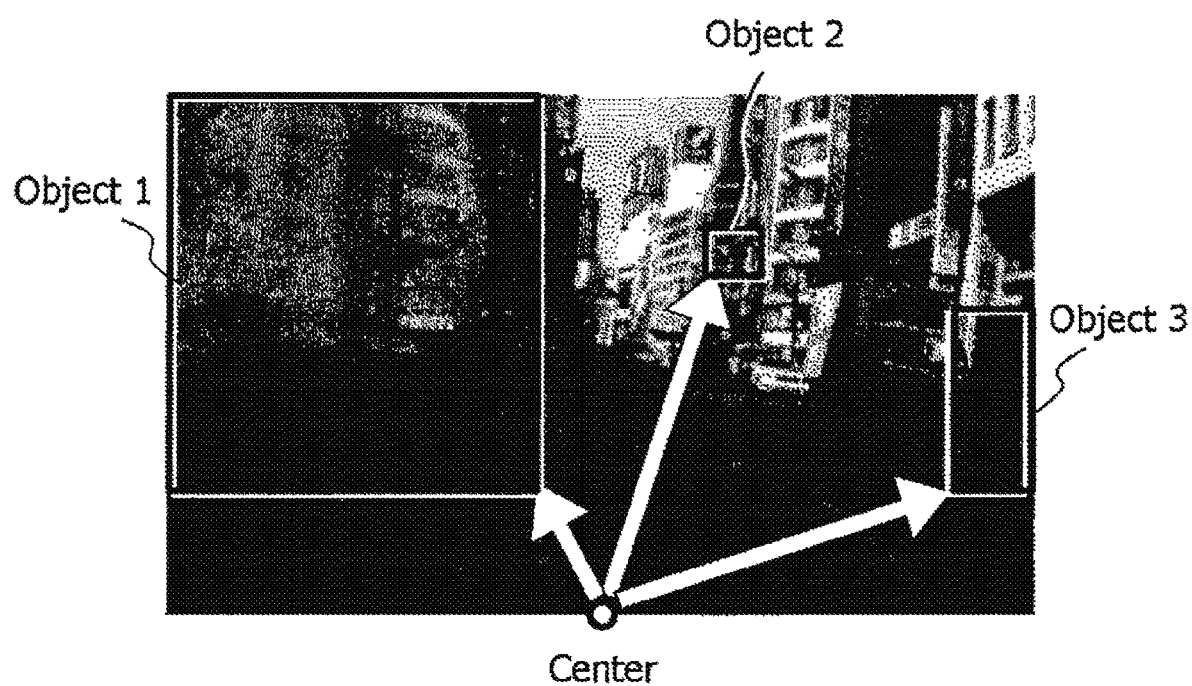

FIG. 11
|  |  | Horizontal position x (pixel) | | | | |
|---|---|---|---|---|---|---|
|  |  | ~ -900 | -900 ~ -800 | ... | -100 ~ 100 | ... | 900~ |
| Vertical position y (pixel) | 1200~ | 16x16 | 32x32 | ... | 64x64 | ... | 16x16 |
| | ... | ... | ... | ... | ... | ... | ... |
| | 200~300 | 64x64 | 128x128 | ... | 256x256 | ... | 64x64 |
| | 100~200 | 64x64 | 128x128 | ... | 256x256 | ... | 64x64 |
| | ~100 | 64x64 | 128x128 | ... | 256x256 | ... | 64x64 |
Reduced size (pixel x pixel)
FIG. 12A
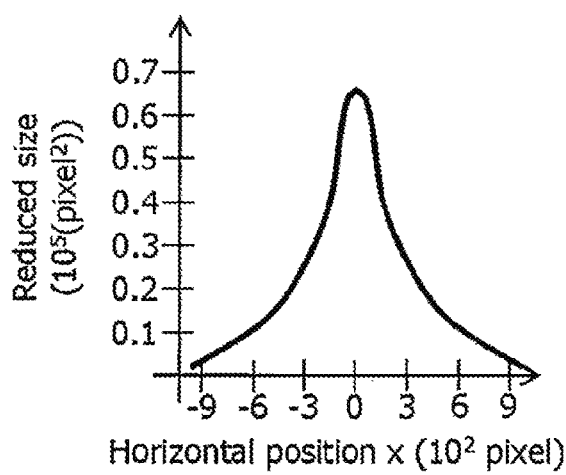
FIG. 12B
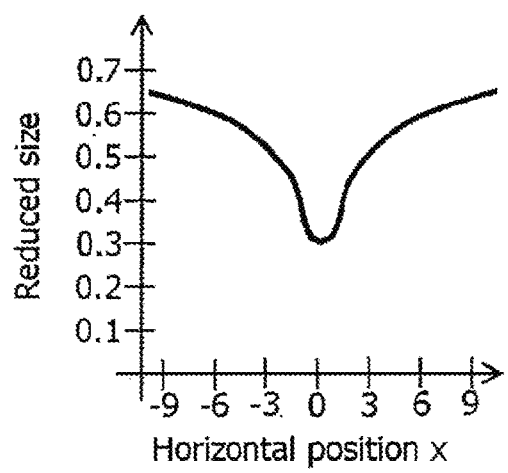

*FIG. 13A*
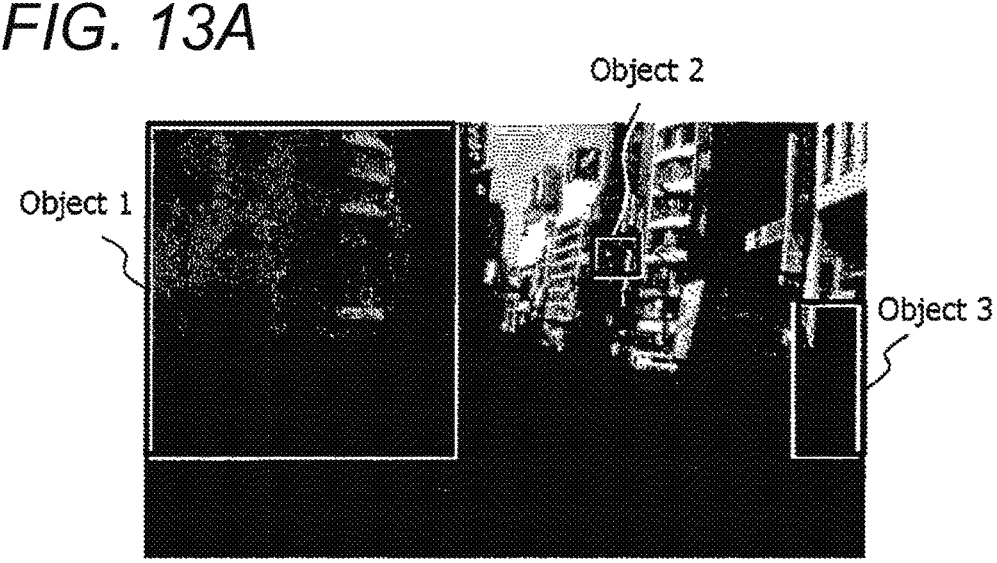
*FIG. 13B*
| Items | Distance d |
|---|---|
| Object 1 | 8 m |
| Object 2 | 53 m |
| Object 3 | 14 m |
| ... | ... |
*FIG. 14A*
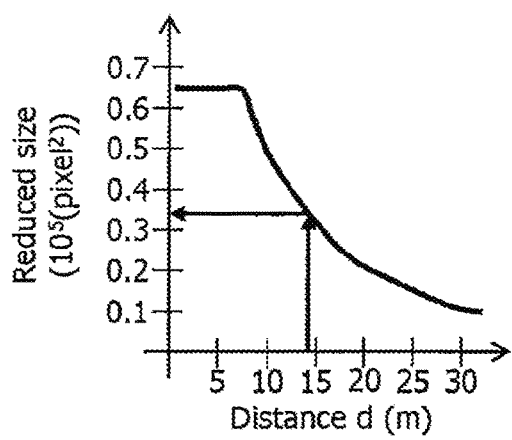
*FIG. 14B*
| Distance d | Reduced size |
|---|---|
| ~5m | 256x256 |
| 5m~15m | 128x128 |
| 15m~40m | 64x64 |
| ... | ... |

FIG. 16A
| Items | Distance d | Direction ($\phi$, $\theta$) |
|---|---|---|
| Object 1 | 8 m | (-45°, 65°) |
| Object 2 | 53 m | (20°, 30°) |
| Object 3 | 14 m | (60°, 55°) |
| ... | ... | ... |
FIG. 16B
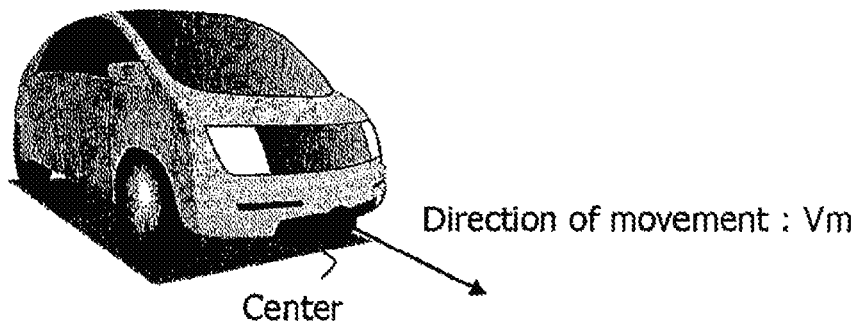
FIG. 16C
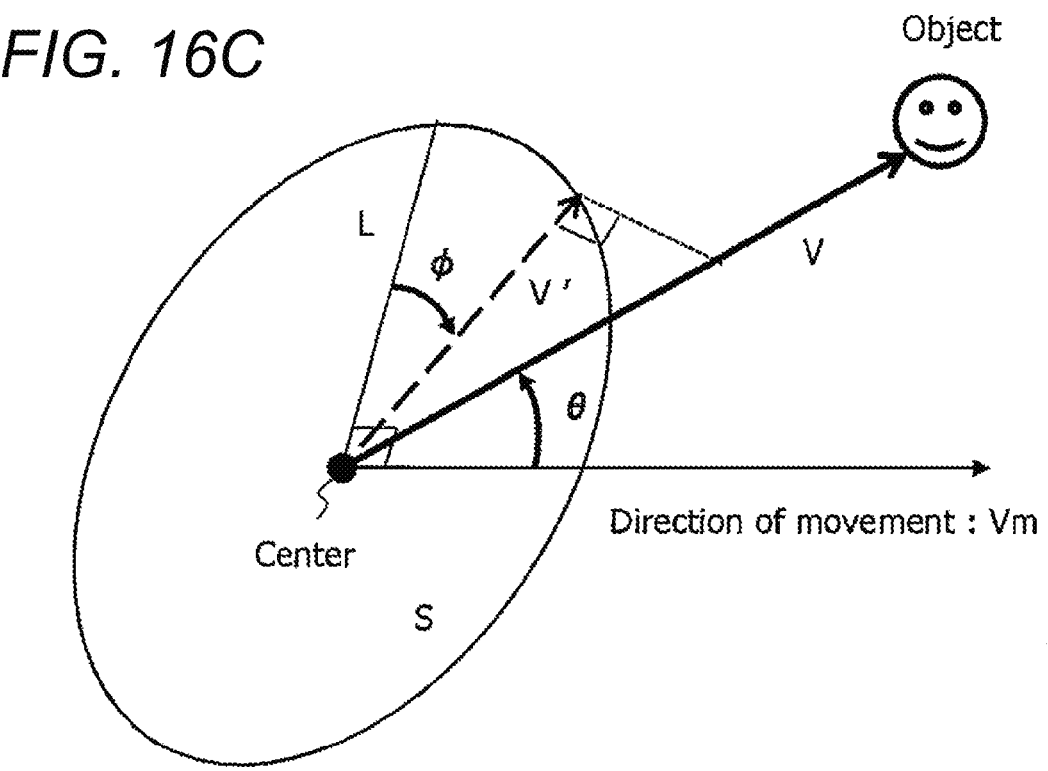

FIG. 18A

| | | φ | | | | |
|---|---|---|---|---|---|---|
| | | -90° ~ -80° | ... | 0° ~ 10° | ... | 80° ~ 90° |
| θ | 0° ~ 10° | ID=0 | ... | 9 | ... | 17 |
| | 10° ~ 20° | 18 | ... | 27 | ... | 35 |
| | 20° ~ 30° | 36 | ... | 45 | ... | 53 |
| | ... | ... | ... | ... | ... | ... |
| | 80° ~ 90° | 144 | ... | 153 | ... | 161 |

Table ID

| Distance d | Reduced size |
|---|---|
| ~10m | 256x256 |
| 10m~20m | 128x128 |
| 20m~50m | 64x64 |
| ... | ... |

ID=144
(φ = -90° ~ -80°, θ = 80° ~ 90°)

| Distance d | Reduced size |
|---|---|
| ~5m | 128x128 |
| 5m~10m | 64x64 |
| 10m~20m | 32x32 |
| ... | ... |

FIG. 25A
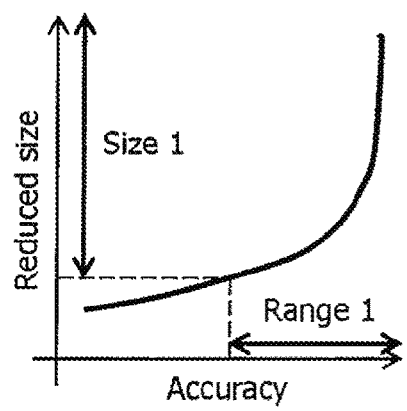
FIG. 25B
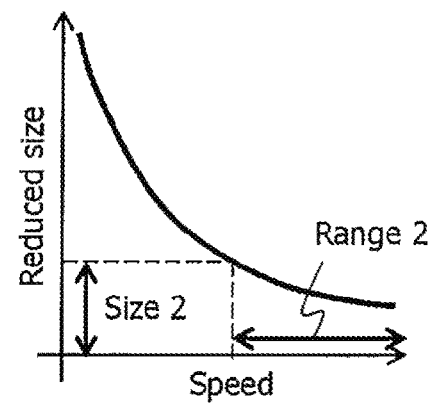
FIG. 25C
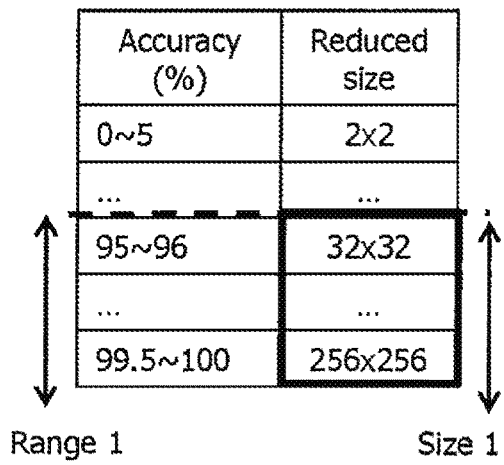
FIG. 25D
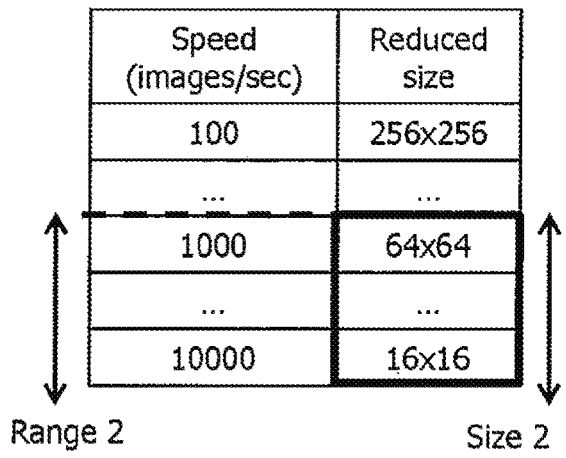
FIG. 25E
(Size 1) ∩ (Size 2) = (32x32 ~ 64x64)

FIG. 29A

| Items | Priority |
|---|---|
| Object 1 | 0.53 |
| Object 2 | 0.37 |
| Object 3 | 2.01 |
| Object 4 | 0.66 |
| Object 5 | 0.33 |
| Object 6 | 1.57 |
| Object 7 | 1.08 |
| Object 8 | 2.15 |
| Object 9 | 0.11 |
| ... | ... | sort →

FIG. 29B

| Items | Priority |
|---|---|
| Object 8 | 2.15 |
| Object 3 | 2.01 |
| Object 6 | 1.57 |
| Object 7 | 1.08 |
| Object 4 | 0.66 |
| Object 1 | 0.53 |
| Object 2 | 0.37 |
| Object 5 | 0.33 |
| Object 9 | 0.11 |
| ... | ... |

FIG. 32A
| # | Categories | Probability |
|---|---|---|
| 1 | car | 0.12 |
| 2 | pedestrian | 0.75 |
| ... | ... | ... |
| M | light | 0.04 |
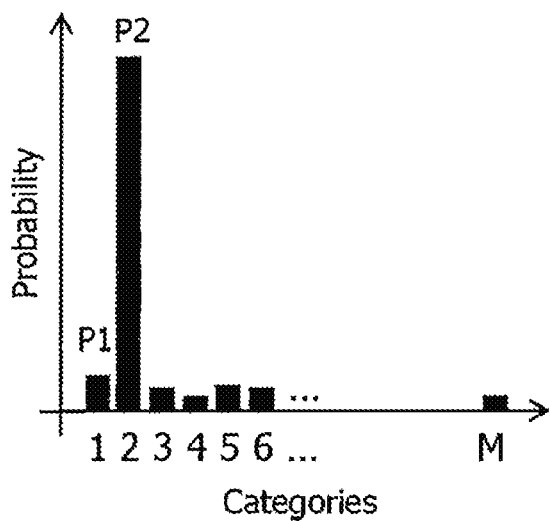
FIG. 32B
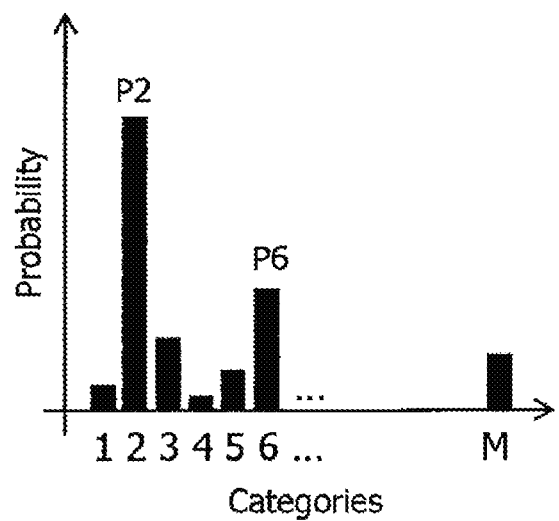
FIG. 32C

IMAGE RECOGNITION SYSTEM

BACKGROUND OF THE INVENTION

1. Field of the Invention

The present invention relates to an image recognition system achieving high speed and power saving of an image recognition process.

2. Description of the Related Art

In recent years, advancement of data recognition algorithm such as deep learning has led to improvement of recognition accuracy of sounds and images by means of a computer. Along with this trend, a movement to apply the deep learning to autonomous driving, machine translation, and the like has become active.

For example, in the autonomous driving, a movie captured by a camera mounted in an autonomous car is required to be instantaneously recognized, judged, and reflected in operations of a control system such as a steering wheel. Thus, a way to transmit movie data captured in the autonomous car to a cloud, execute a recognition process in a computer on the cloud, and return a recognition result to the autonomous car is unrealistic in terms of speed and reliability. For this reason, the recognition process of the movie captured by the camera is required to be executed on a device mounted in the car. However, the device mounted in the car is limited in terms of electric power and a space. On the other hand, to perform a high-speed recognition process of movies, an enormous operational circuit and a high-capacity memory are required. Accordingly, it is difficult to perform a high-speed recognition process with limited electric power.

JP 2005-346297 A discloses a solid recognition device identifying a solid by means of a simple process, and WO 2010/044214 A discloses a face recognition device reducing data transfer volume in face recognition.

SUMMARY OF THE INVENTION

To perform a high-speed recognition process of images on a device or a terminal in which power consumption is limited such as a car-mounted system for an autonomous car, the number of times of operation required for a recognition process and the capacity of a memory for storing data are required to be reduced while accuracy and reliability of the recognition are maintained.

In a technique disclosed in JP 2005-346297 A, a two-dimensional distance image of a solid to be recognized is prepared with use of a stereo camera, distance data of the distance image is substituted with representative data of a distance value based on a predetermined set separation number, and the representative data is input in a neural network, to perform a high-speed recognition process. However, in this technique, the recognition process is performed not based on the image data itself but based on the substitution distance data. Also, the process is equally performed regardless of the size and the distance of the target to be recognized. Thus, this technique has a problem in which recognition accuracy is lowered depending on the situation of the target to be recognized.

Also, in a technique disclosed in WO 2010/044214 A, an image showing a face is normalized to have a fixed size and is thus reduced in size to reduce the data transfer volume. However, the size of the image is reduced into the predetermined fixed size regardless of the size and the distance of the target to be recognized. Thus, similarly to the technique in JP 2005-346297 A, this technique has a problem in which recognition accuracy is lowered depending on the situation of the target to be recognized.

An object of the present invention is to provide an image recognition system performing a recognition process while required recognition accuracy and recognition speed are maintained even in a case where the size, shape, distance, position, and the like of a target to be recognized are changed.

An example of the present invention is an image recognition system performing a recognition process of at least one target to be recognized included in an image, the image recognition system including: an external information detection unit detecting a distance to the target to be recognized included in the image; a reduced image size determination unit deriving a reduced size of the image based on the distance to the target to be recognized detected in the external information detection unit; an image reduction unit reducing the image based on the reduced size of the image derived in the reduced image size determination unit; and an image recognition unit including a plurality of recognition process units corresponding to sizes of the images to be recognized and executing the recognition process of the target to be recognized included in the image reduced in the image reduction unit by means of the recognition process unit corresponding to a size of the image.

According to the present invention, in a device with limited electric power such as an autonomous car, by reducing a size of an image to be recognized into an optimal size and providing a recognition process unit for each image size, the number of times of operation and the capacity of a memory required for image recognition can be reduced, and image recognition can be performed with low power and at high speed.

BRIEF DESCRIPTION OF THE DRAWINGS

FIGS. 9A and 9B illustrate an example of information transmitted from the external information detection unit 1 <Case 2>;

FIG. 11 illustrates a table describing a relation between a clip position and a reduced size of an image;

FIGS. 12A and 12B illustrate plans to determine a reduced size;

FIGS. 13A and 13B illustrate an example of information transmitted from the external information detection unit 1 <Case 3>;

FIGS. 14A and 14B illustrate a relation between a distance to an object and a reduced size;

FIGS. 16A to 16C illustrate an example of information transmitted from the external information detection unit 1<Case 4>;

FIGS. 18A and 18B illustrate tables each describing a relation between a distance and a direction with respect to an object and a reduced size;

FIGS. 25A to 25E illustrate a method for determining a reduced size of an image;

FIGS. 29A and 29B illustrate an example of a sort process;

FIGS. 32A to 32C describe a method for checking credibility of a recognition result.

DESCRIPTION OF THE PREFERRED EMBODIMENTS

Hereinbelow, an example case where an embodiment of an image recognition system according to the present invention is applied to an autonomous driving system will be described. That is, in the image recognition system according to the present invention, what an object is in an external image captured by a camera or the like mounted in an autonomous car is recognized, and various operations of the autonomous car are performed with use of a recognition result. In the following description, an object that is to be recognized by the image recognition system according to the present invention will be referred to as "a target to be recognized" or simply as "an object."

Figure 1:
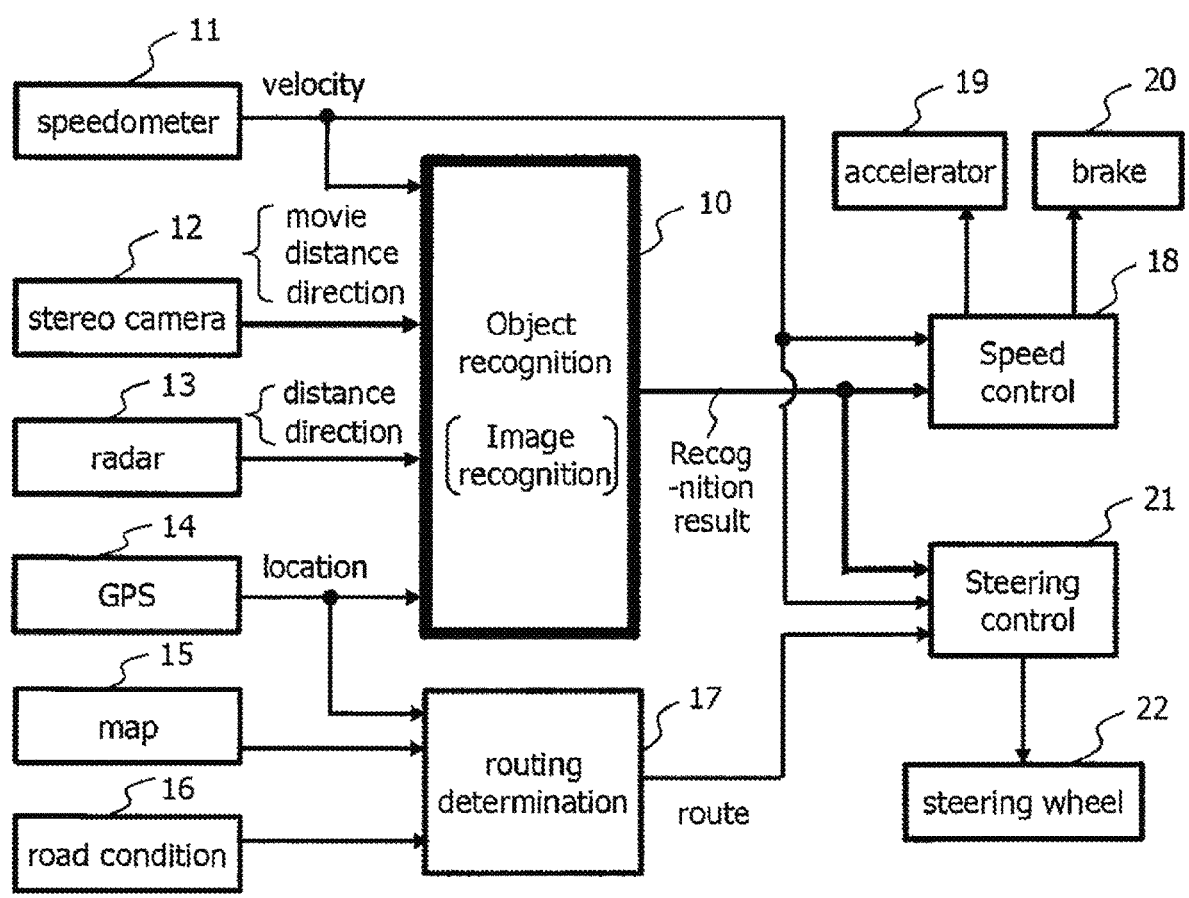
FIG. 1 is a configuration diagram illustrating an example of an autonomous driving system.

FIG. 1 is a configuration diagram illustrating an example of an autonomous driving system. An autonomous driving system 100 is configured to include a speedometer (speedometer) 11, a stereo camera 12 (stereo camera), a radar 13 (radar), a GPS system 14 (GPS), a map acquisition system 15 (map), a road condition acquisition system 16 (road condition), an object recognition system 10 (object recognition), a routing determination system 17 (routing determination), a speed control system 18 (speed control), an accelerator 19 (accelerator), a brake 20 (brake), a steering angle control system 21 (steering control), and a steering wheel 22 (steering wheel). In the autonomous driving system 100, the image recognition system (image recognition) according to the present invention is applied to the object recognition system 10.

The speedometer 11 transmits a current velocity (velocity) of a car to the object recognition system 10 and the steering angle control system 21. The stereo camera 12 transmits a movie (movie) captured and a distance (distance) and a direction (direction) with respect to an object calculated based on a disparity to the object recognition system 10. The radar 13 transmits a distance and a direction with respect to the object to the object recognition system 10. The GPS system 14 transmits current location information (location) of the car to the object recognition system 10 and the routing determination system 17. The map acquisition system 15 transmits nearby map information (roads, buildings, shops, and the like) to the routing determination system 17. The road condition acquisition system 16 transmits information about a road congestion condition, a temporary road closure due to roadworks, and the like to the routing determination system 17. The routing determination system 17 determines an optimal route that the car is to follow from the information and transmits the route (route) to the steering angle control system 21.

The object recognition system (image recognition system) 10 recognizes what the object is in the captured movie (a car, a person, a traffic light, or the like) based on the transmitted information and transmits a recognition result (recognition result) to the speed control system 18 and the steering angle control system 21. The speed control system 18 controls the accelerator 19 and the brake 20 based on the transmitted information. The steering angle control system 21 controls a steering angle of the steering wheel 22 based on the transmitted information.

In this manner, when the movie, the distance and the direction with respect to the object, the location information, the car velocity, and the like are input, the object recognition system (image recognition system) 10 in the autonomous driving system 100 recognizes what the object is and outputs the recognition result. Hereinbelow, configurations and operations of the image recognition system will be described in detail in Embodiments 1 to 4.

Embodiment 1

Figure 2:
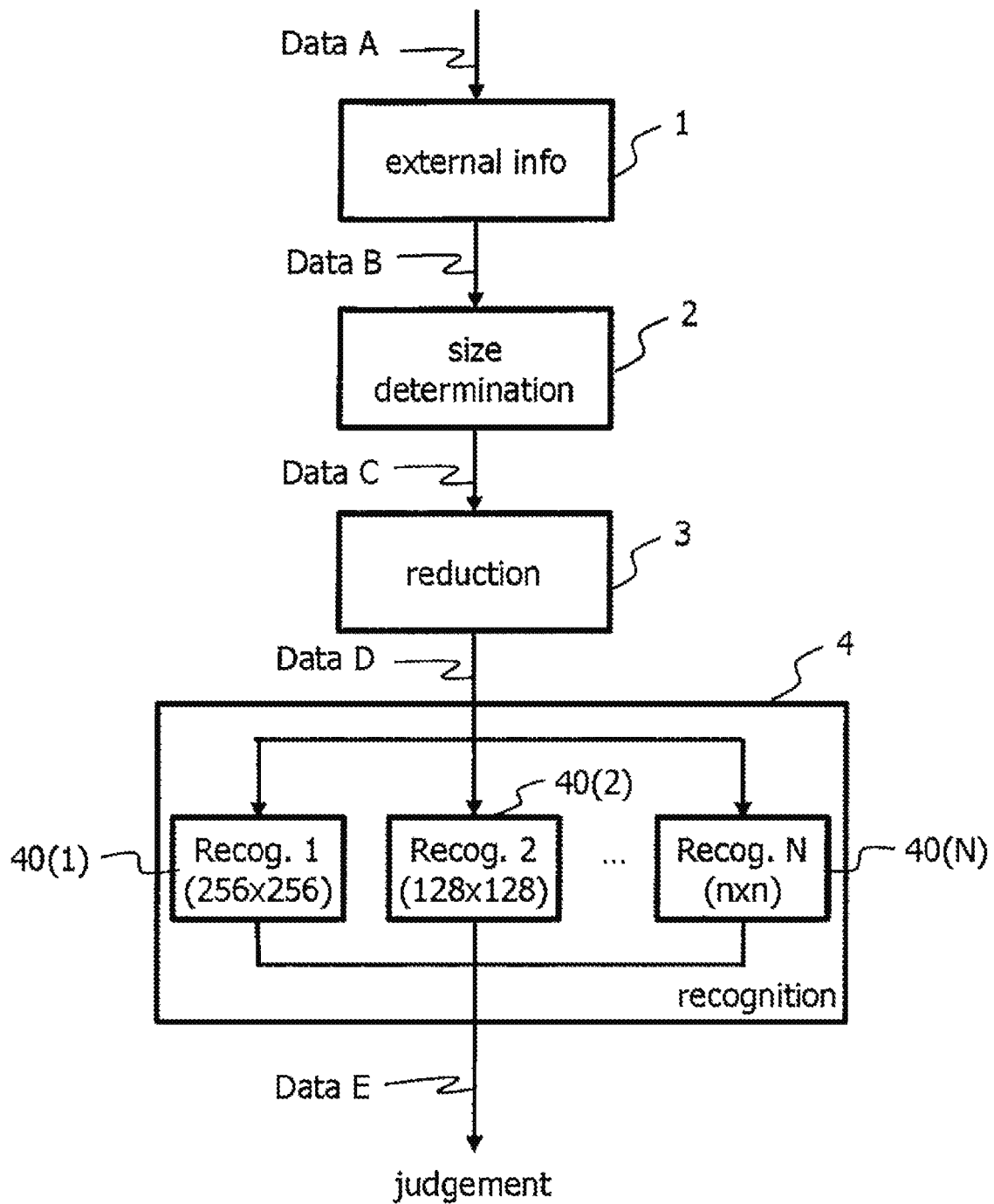
FIG. 2 illustrates a configuration of an image recognition system according to Embodiment 1.

FIG. 2 illustrates a configuration of the image recognition system according to Embodiment 1. The image recognition system 10 includes an external information detection unit 1 (external info), a reduced size determination unit 2 (size determination), an image reduction unit 3 (reduction), and an image recognition unit (recognition). Also, the image recognition unit 4 includes a plurality of recognition process units 40(1) to 40(N), and the respective recognition process units 40 process images of different sizes (pixel values). In the example illustrated in FIG. 2, the recognition process unit 40(1) processes an image of 256×256 pixels in size, and the recognition process unit 40(2) processes an image of 128×128 pixels in size. As the size of the image to be processed in the recognition process unit 40 increases, the recognition accuracy becomes higher, but the time required for the recognition process becomes longer. Accordingly, it is important to select an image size appropriately in accordance with the recognition accuracy and the recognition time. The above image sizes are illustrative only, and specific image sizes may arbitrarily be set.

Operations of the respective units and a data flow in the image recognition system 10 will be described. Data A is information that the image recognition system 10 acquires externally. In the autonomous driving system 100 in FIG. 1, Data A includes a movie acquired from the stereo camera 12, a distance and a direction with respect to an object (a target to be recognized) calculated from a disparity of the stereo camera 12 or acquired from the radar 13, a car velocity measured by the speedometer 11, location information acquired from the GPS system 14, and the like.

The external information detection unit 1 extracts Data B from Data A. Data B includes a clipped image for each object extracted from the movie, a size (a pixel value) of the clipped image, a shape of the clipped image, a clip position, a distance and a direction with respect to the object included in the clipped image, and the like. Data B also includes the car velocity, the number of objects included in one frame of the movie, geographical information representing a current location of the car, and the like.

The reduced size determination unit 2 determines an image size after reduction (hereinbelow referred to as a reduced size as well) based on Data B and outputs the reduced size as Data C. Data C includes the image data before reduction as well. The reduced size determination unit 2 determines an optimal reduced size based on various parameters such as the size and the shape of the clipped image. Specific methods for determining the reduced size in various cases will be described below.

The image reduction unit 3 performs a reduction process of the image data based on Data C to acquire the reduced image size determined in the reduced size determination unit 2 and outputs the reduced image data as Data D. Detailed operations of the image reduction unit 3 will be described below with reference to FIGS. 7A to 7D.

The image recognition unit 4 performs a recognition process of the object included in Data D (reduced image data) with use of one of the recognition process units 40(1) to 40(N) corresponding to the size of Data D. A recognition result is output as Data E. The recognition result (Data E) is transmitted to the speed control system 18 and the steering angle control system 21 in FIG. 1 and is used for judgement (judgement) of the control systems for operations of the accelerator, the brake, the steering wheel, and the like. Detailed operations of the image recognition unit 4 will be described below with reference to FIGS. 8A and 8B.

First, detailed operations of the reduced size determination unit 2 will be described. When a reduced image size is to be determined, not all information described above (the size, the distance, and the like) is required to be used as Data B, and the information may partially be used depending on the case. Thus, information to be used for determination of a reduced size (hereinbelow, reduction determination parameters) will be described in <Case 1> to <Case 6>.

<Case 1> Case where Reduction Determination Parameters are Image Size and Shape

In Case 1, a case where the reduced size determination unit 2 determines a reduced image size based on a size and a shape of a clipped image will be described.

Figures 3A, 3B:
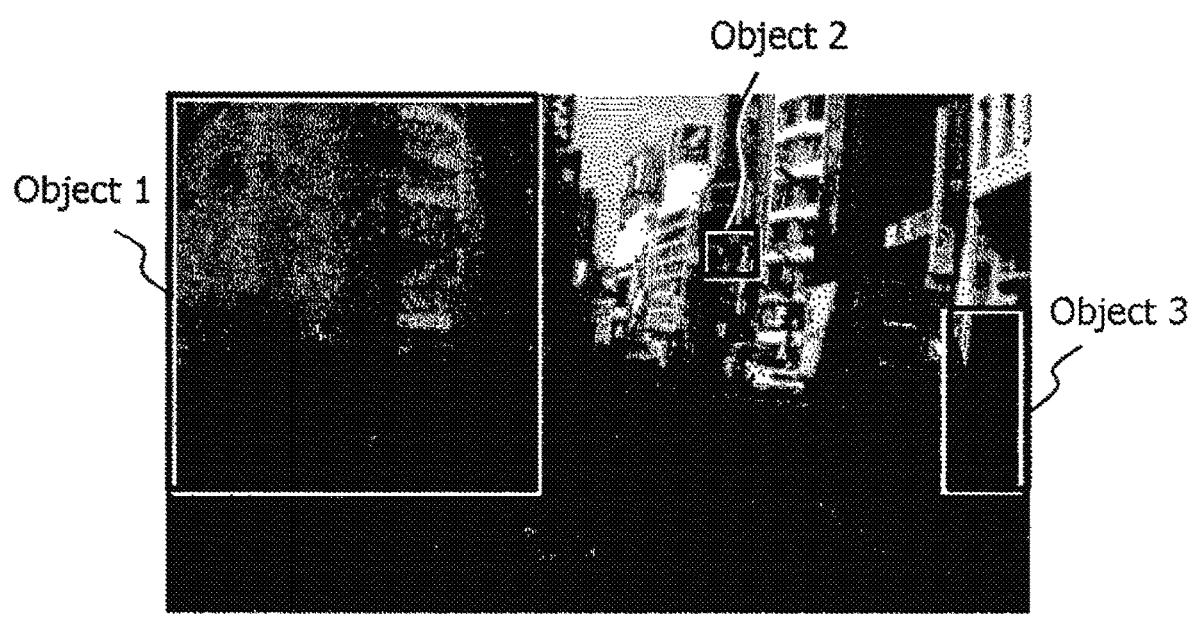
FIGS. 3A and 3B illustrate an example of information transmitted from an external information detection unit 1 <Case 1>.

FIGS. 3A and 3B illustrate an example of information (Data B) transmitted from the external information detection unit 1 to the reduced size determination unit 2. FIG. 3A illustrates a state in which one frame to be subject to a recognition process is clipped from a movie that the external information detection unit 1 has acquired by means of the stereo camera 12, and in which objects (objects) included in the frame image are clipped. An image including a clipped object is referred to as "a clipped image." Object 1 is an example in which "a truck" is clipped, Object 2 is an example in which "a traffic light" is clipped, and Object 3 is an example in which "a pedestrian" is clipped. These are objects related to driving control. Although only three objects are illustrated in FIG. 3A for convenience, clipped images of all objects (targets to be recognized) related to driving control are actually generated.

FIG. 3B illustrates additional data of the clipped images, and the data includes a size of the clipped image (original size) and an aspect ratio (ratio) representing a shape of the clipped image for each object. The size of the clipped image and the shape of the clipped image change in various ways depending on the size of the object, the distance from the camera, and the like. The information (Data B) is transmitted to the reduced size determination unit 2.

Figure 4A:
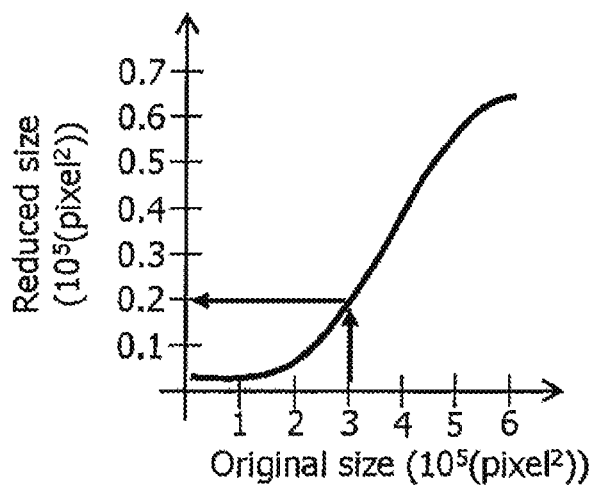
FIGS. 4A to 4F illustrate graphs each illustrating a relation between an original size and shape and a reduced size of an image.
Figure 4D:
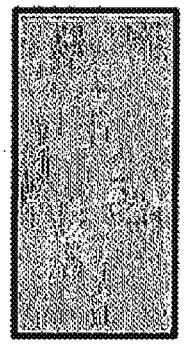
Figure 4B:
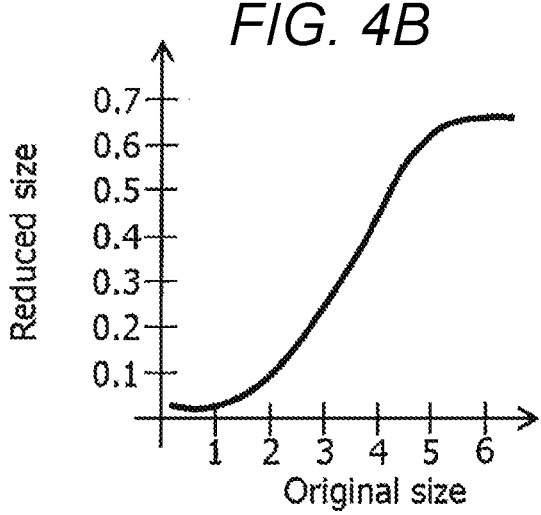
Figure 4E:
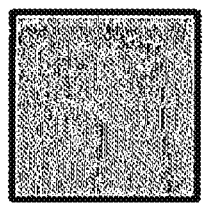
Figure 4C:
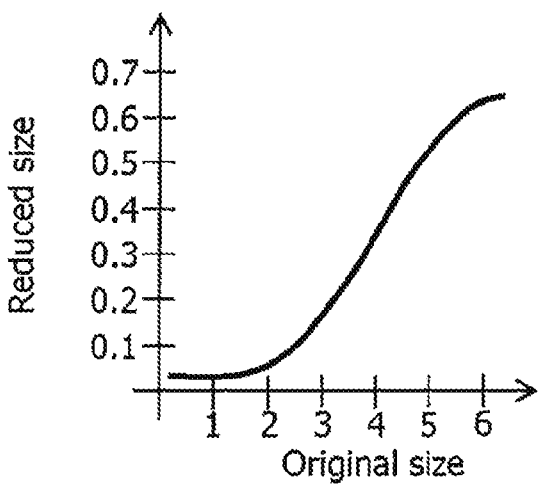

FIGS. 4A to 4F illustrate graphs each illustrating an example of a reduced size determined by the reduced size determination unit 2. FIGS. 4A to 4C illustrate a relation between an original size and a reduced size of a clipped image. In each graph, the horizontal axis represents the original size (original size) of the clipped image while the vertical axis represents the reduced size of the clipped image, and basically, the larger the original size of the clipped image is, the larger the reduced size thereof is. However, the reduction ratio is not constant, and in a region in which the original size is small or a region in which the original size is large, the graph is in a non-linear curve (S-shaped curve). For example, in FIG. 4A, an image whose original size is $3\times10^5$ pixels is reduced to an image whose size is $0.2\times10^5$ pixels, and the reduction ratio is 1/15.

Figure 4F:
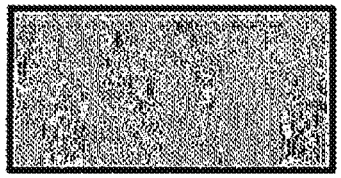

Determination of the reduced size depends not only on the original size of the image but also on the shape of the image. As illustrated in FIGS. 4D to 4F, it is highly probable that the object is "a person" when the shape of the clipped image is vertically long (aspect ratio=2) as in FIG. 4D, that the object is "a car" when the shape of the clipped image is close to a square (aspect ratio=1) as in FIG. 4E, and the object is "a traffic light" when the shape of the clipped image is horizontally long (aspect ratio=0.5) as in FIG. 4F. Since required recognition performances (recognition accuracy and recognition speed) differ depending on the object, the reduction ratios of images are changed depending on the shapes even when the original sizes of the images are equal.

The reduced size determination curves illustrated in FIGS. 4A to 4C are for the cases in which the shapes of the clipped images are FIGS. 4D to 4F, respectively. The reduced size determination unit 2 determines which of FIGS. 4D to 4F the shape (aspect ratio) of the clipped image transmitted from the external information detection unit 1 is close to and determines the reduced size with use of corresponding one of the reduced size determination curves FIGS. 4A to 4C.

In this manner, the reduced size can be determined by the reduced size determination unit 2 by means of calculation using any of the reduced size determination curves illustrated in FIGS. 4A to 4C. However, since the reduced size is calculated per clipped image, the process time may be long. Thus, in practice, a method of preparing in advance a table describing values of reduced sizes with use of sizes and shapes of images as parameters and determining a reduced size with reference to the table is effective.

Figure 5:
FIG. 5 illustrates a table describing a relation between an original size and shape and a reduced size of an image.

FIG. 5 illustrates an example of a table describing a relation between an original size and shape and a reduced size of an image. In this table, original sizes of a clipped image are classified in the horizontal direction (row direction), shapes (aspect ratios) of a clipped image are classified in the vertical direction (column direction), and appropriate reduced image sizes to the combinations between the original sizes and the shapes derived in FIGS. 4A to 4F are described. By referring to a corresponding position in the table based on parameters (a size and a shape) of a clipped image transmitted from the external information detection unit 1, the reduced size determination unit 2 can derive a reduced image size easily and promptly.

The relation between the original sizes and shapes of images and the optimal reduced sizes illustrated in FIGS. 4A to 4F and 5 is determined in advance in consideration of statistical information of an enormous amount of learning data for use in learning in the image recognition unit 4, safety, a probability theory, and the like. Accordingly, a process in which the reduced size determination unit 2 determines a reduced image size can basically be reference of the table in FIG. 5 or simple calculations in FIGS. 4A to 4F and requires overwhelmingly lower process load than a below-mentioned image recognition process by means of the image recognition unit 4 does. Accordingly, an influence that the process by means of the reduced size determination unit 2 has on process time and a circuit size of the entire image recognition system in the present embodiment is almost negligible.

The relation between the original sizes and the reduced sizes illustrated in FIGS. 4A to 4F and 5 is illustrative only. In a case where the priority of required recognition performances differs, the relation may be reversed. In general, as the reduced image size is larger, the accuracy of the image recognition is improved further, but the time required for the image recognition is longer (the recognition speed is lowered). Also, in a case where the original size of the clipped image is large, that means that the distance to the object (for example, a car in front) is short, and the recognition speed is ought to be raised. When these are taken into consideration, the reduced size determination curve is in a different pattern.

Figure 6A:
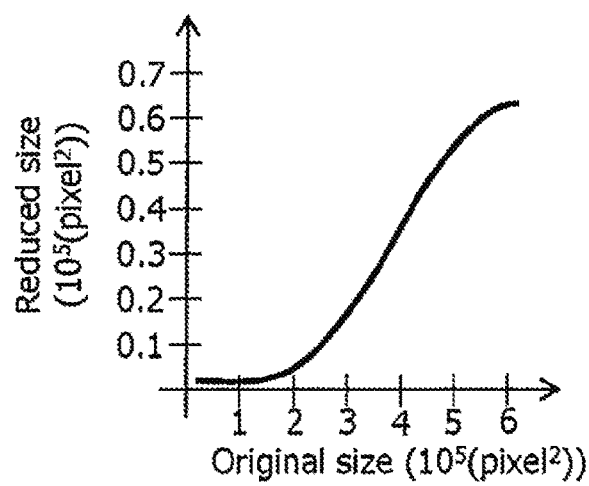
FIGS. 6A to 6C illustrate plans to determine a reduced size.
Figure 6B:
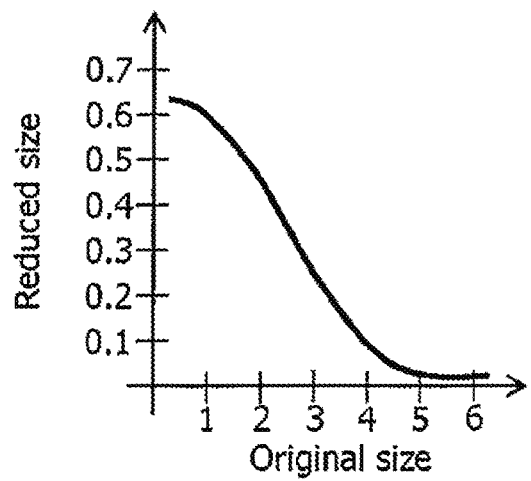
Figure 6C:
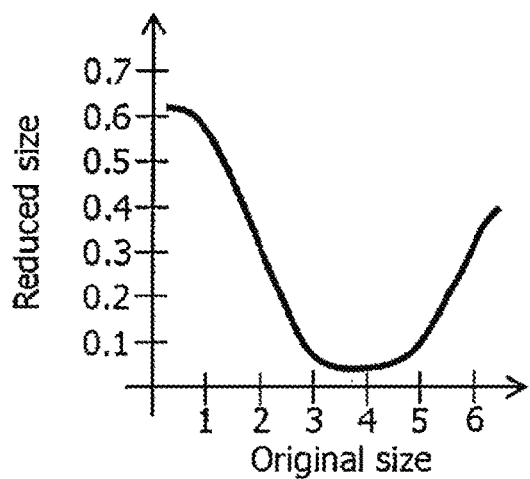

FIGS. 6A to 6C illustrate plans to determine a reduced size for an original image size. There exist three determination plans FIGS. 6A to 6C in accordance with the priority of required recognition performances such as the recognition accuracy and the recognition speed.

FIG. 6A illustrates a case where the recognition accuracy is prioritized (accuracy priority). In this case, the original size and the reduced size are in a relation in which, the larger the original size of the clipped image is, the larger the reduced size is (similar to FIGS. 4A to 4F). That is, as the distance to the object is shorter (the original size is larger), the reduced size becomes larger to improve the recognition accuracy.

Conversely, FIG. 6B illustrates a case where the recognition speed is prioritized (speed priority). In this case, the original size and the reduced size are in a relation in which, the larger the original size of the clipped image is, the smaller the reduced size is (an opposite relation of FIGS. 4A to 4F). That is, as the distance to the object is shorter (the original size is larger), the reduced size becomes smaller to improve the recognition speed.

Further, FIG. 6C is a compromise plan (compromise plan) between FIGS. 6A and 6B. In a region in which the original size is large, the recognition accuracy is prioritized as in FIG. 6A, and in a region in which the original size is small, the recognition speed is prioritized as in FIG. 6B.

Which of the above determination plans FIGS. 6A to 6C is to be employed should be determined as appropriate in consideration of which of the recognition performances (the recognition accuracy and the recognition speed) is to be prioritized based on the kind of the target to which the image recognition system is applied, that is, the object, and the driving situation. In any of the cases, the original size and the shape of the clipped image and the reduced image size are in a predetermined relation, and the reduced image size is determined based on this relation.

FIGS. 7A to 7D illustrate an image reduction process by means of the image reduction unit 3. The image reduction unit 3 performs the reduction process to the clipped image in accordance with the reduced image size determined by the reduced size determination unit 2. Here, typical reduction methods will be described.

Figure 7A:
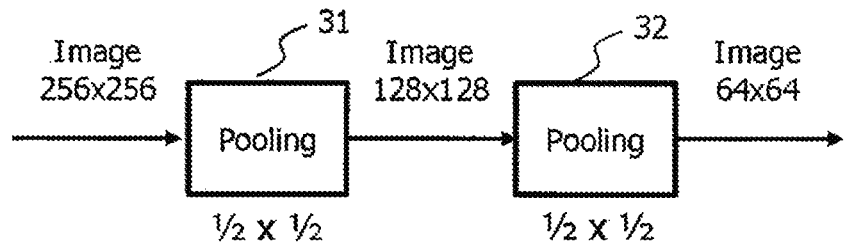
FIGS. 7A to 7D illustrate an image reduction process.

FIG. 7A illustrates an example in which an image reduction process is performed in several steps. An image of 256×256 pixels is first reduced to an image of 128×128 pixels in a first reduction process 31 (pooling), and the image of 128×128 pixels is then reduced to an image of 64×64 pixels in a second reduction process 32 (pooling). In this case, in each of the reduction processes, an image size is reduced to a ½×½ size.

Figure 7B:
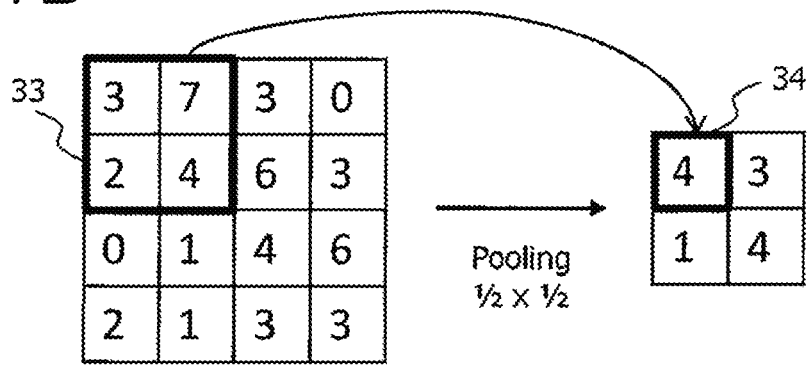

FIG. 7B illustrates an image reduction process by means of average pooling (average pooling). Image data (4×4 pixels) before reduction is illustrated on the left side, and image data (2×2 pixels) after reduction is illustrated on the right side. Although, in a case of a color image, three 8-bit numbers (for three colors) are included per pixel in an actual case, for example, one of the numbers for one color is illustrated in this figure for simplification. For example, in the average pooling, among the image data before reduction on the left side, an average value of values in a region of 2×2 pixels enclosed by a black frame 33, (3+7+2+4)/4=4, is calculated, and the average value is substituted as a value of a pixel 34 in the image data after reduction, to reduce the image size to a ½×½ size.

Figure 7C:
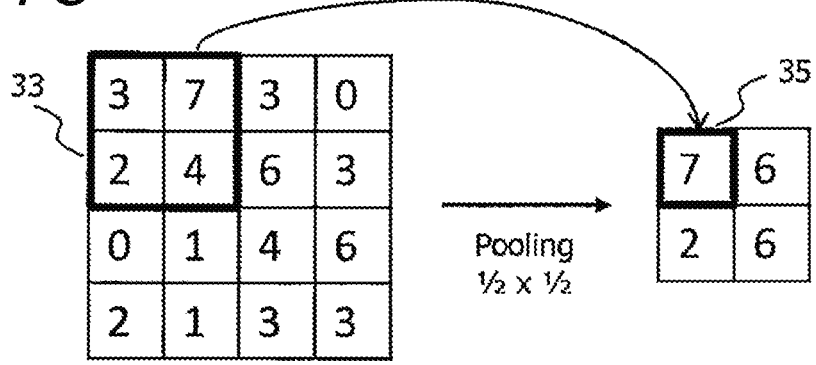

FIG. 7C illustrates an image reduction process by means of max pooling (max pooling). Among image data before reduction on the left side, a maximum value of values in the region of 2×2 pixels enclosed by the black frame 33, 7, is calculated, and the maximum value is substituted as a value of a pixel 35 in image data after reduction, to reduce the image size to a ½×½ size.

Figure 7D:
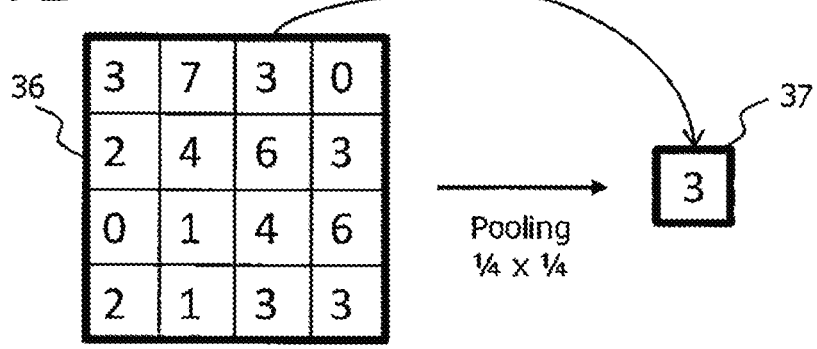

FIG. 7D also employs the average pooling (average pooling) and performs the two-step reduction process illustrated in FIG. 7A at a time. An average value of values in a region of 4×4 pixels enclosed by a black frame 36 (=3) is calculated, and the average value is substituted as a value of a pixel 37 in image data after reduction, to reduce the image size to a ¼×¼ size at a time.

When the two-step reduction method as in FIG. 7A and the one-step reduction method as in FIG. 7D are compared, the respective methods have advantages and disadvantages. In the two-step reduction method, since the same reduction circuit can be used in common in the process 31 of reducing the image to the image of 128×128 pixels and the process 32 of reducing the image to the image of 64×64 pixels, the implementation circuit size can be restricted. However, the number of times of operation is larger than that in the one-step reduction method. On the other hand, in the one-step reduction method, since the number of times of operation is smaller than that in the two-step reduction method, the process speed can be increased. However, a reduction circuit needs to be provided per reduced size, which causes the implementation circuit size to be enlarged.

Meanwhile, in the image reduction process described in FIGS. 7A to 7D, the number of times of product-sum operation for the pixel values is approximately equivalent to the number of pixels included in an image and is approximately tens of thousands of times to hundreds of thousands of times per image. On the other hand, in the below-mentioned image recognition process, the product-sum operation is performed approximately hundreds of millions of times per image although the number of times depends on the reduced image size. Hence, an influence that the image reduction process performed in the present embodiment has on the process time and the circuit size of the entire image recognition system is extremely small and is in a negligible level.

Figures 8A, 8B:
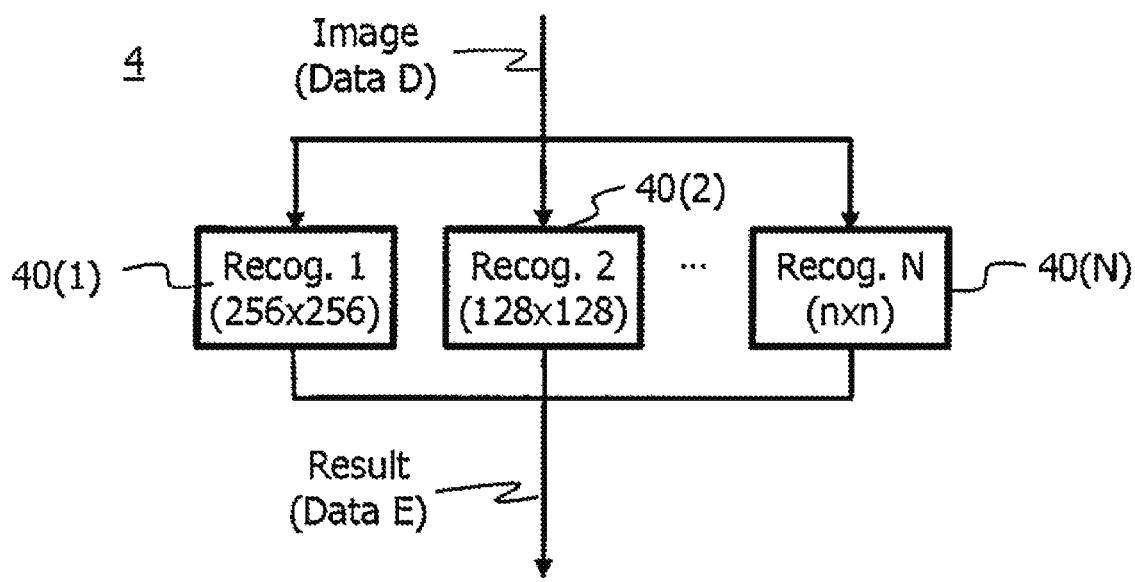
FIGS. 8A and 8B illustrate an image recognition process.

FIGS. 8A and 8B illustrate an image recognition process by means of the image recognition unit 4. FIG. 8A illustrates a flow of input and output data, and FIG. 8B illustrates an example of output data.

As illustrated in FIG. 8A, reduced image data (image) (Data D) is input into the image recognition unit 4. As described above in FIG. 2, the image recognition unit 4 includes the plurality of recognition process units 40(1) to 40(N) to correspond to the input image sizes and selects which recognition process unit is used in accordance with the input image size. Accordingly, by using a process circuit appropriate to the image size, the process can be performed most efficiently. When a recognition process is performed by any of the recognition process units 40(1) to 40(N), a result (result) (Data E) of the recognition process is output.

FIG. 8B illustrates an example of the result of the recognition process. For example, in a case where a convolutional neural network is used for the image recognition unit 4 (recognition process unit 40), what the probability that respective categories (a car, a pedestrian, a traffic light, and the like) exist in an image to be recognized is, is output as the result. Normally, a category having the highest probability among these categories is selected as a recognition result, and in the example in FIG. 8B, the target is judged to be "pedestrian" (pedestrian), which has the highest probability. A recognition algorithm to be used for the image recognition unit 4 (recognition process unit 40) is not limited to the convolutional neural network as long as the algorithm causes the recognition process speed to be raised by reducing the image size. For example, an algorithm of extracting image feature descriptors such as HOG (Histogram of Oriented Gradient), SIFT (Scale Invariant Feature Transform), and SURF (Speed-Up Robust Features) and performing categorization by means of a support vector machine or the like may be employed.

A sequence of operations of the image recognition system 10 has been described above, and various reduction determination parameters other than the image size and the shape can be used when the reduced size determination unit 2 determines a reduced size. Hereinbelow, cases of using other reduction determination parameters will be described in <Case 2> to <Case 6>.

<Case 2> Case where Reduction Determination Parameter is Clip Position

In Case 2, a case where the reduced size determination unit 2 determines a reduced image size based on a clip position of a clipped image will be described.

FIGS. 9A and 9B illustrate an example of information (Data B) transmitted from the external information detection unit 1 to the reduced size determination unit 2. FIG. 9A illustrates an example of a frame image (entire image) transmitted from the external information detection unit 1 and includes similar clipped images (Objects 1, 2, and 3) to those in FIG. 3A. To express a position of each clipped image in the frame image (entire image), a relative vector (white arrow) from a reference position (for example, a center position (center) of a lower side of the frame image) to the clipped image is used.

FIG. 9B illustrates additional data of the clipped images and describes clip positions (relative positions) of the respective clipped images. The clip position is a value (a horizontal component x and a vertical component y) of the relative vector from the reference position to each clipped image as illustrated in FIG. 9A. For example, as for Object 1, the value expresses that the image including an object (truck) is clipped at a position 150 pixels in the horizontal direction and 200 pixels in the vertical direction away from the reference position. This example is illustrative only, and a way to express the clip position is not limited to this example as long as a position (coordinates in the horizontal direction and the vertical direction) of a clipped image in a frame image is clarified.

Figure 10A:
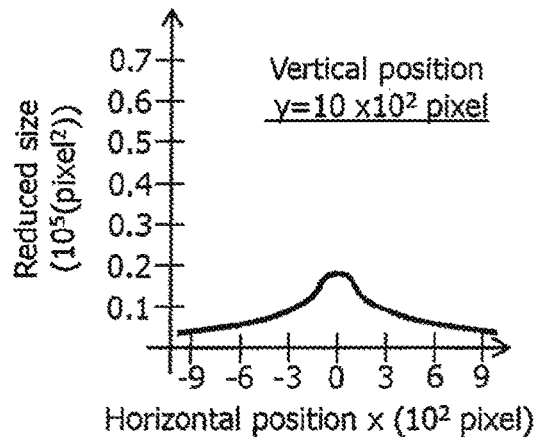
FIGS. 10A to 10D illustrate graphs each illustrating a relation between a clip position and a reduced size of an image.
Figure 10B:
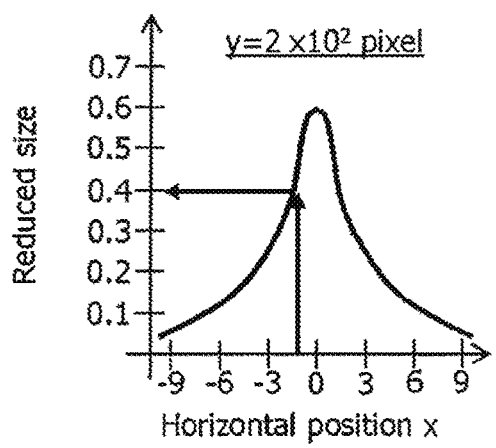
Figure 10C:
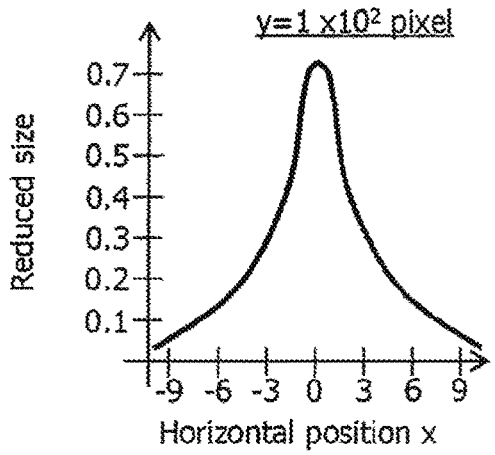
Figure 10D:
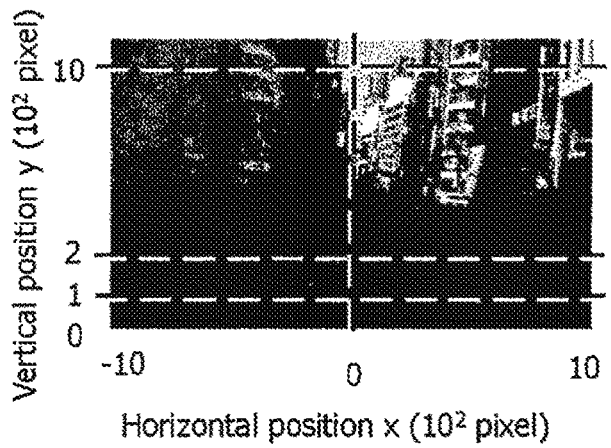

FIGS. 10A to 10D illustrate graphs illustrating examples of reduced sizes determined by the reduced size determination unit 2. Each of the graphs in FIGS. 10A to 10C illustrate a reduced size determination curve. The horizontal axis represents a coordinate x of a clip position in the horizontal direction (horizontal position) while the vertical axis represents a reduced image size (reduced size). FIG. 10D illustrates an example of a frame image and coordinates (x, y) in the image. A reduced image size also depends on a coordinate y of the clip position in the vertical direction (vertical position), and reduced size determination curves in a case of changing the vertical coordinate y are illustrated in FIGS. 10A to 10C.

As for the dependency of the reduced size on the horizontal position x, the reduced size is larger as the horizontal position x is closer to a center (x=0) of the frame image. The reason for this is that, since the center of the image includes a road on which the subject car is to run, a car in front, and the like, the reduced size is larger to raise the recognition accuracy at the center. Also, as for the dependency of the reduced size on the vertical position y, the reduced size is larger as the vertical position y is closer to a lower side (y=0) of the frame image. Since the lower parts of the frame image such as a position of $y=1\times10^2$ pixels and a position of $y=2\times10^2$ pixels are regions on the road close to the subject car, the reduced sizes at the positions are large as in FIGS. 10B and 10C to raise the recognition accuracy.

With use of the relation, in a case where coordinates of a clip position is a position of x=−150 pixels and y=200 pixels (Object 1 in FIGS. 9A and 9B), for example, the reduced size determination curve illustrated in FIG. 10B is used, and the reduced size is derived as $0.4\times10^5$ pixels as illustrated by the arrows in FIG. 10B. It is to be noted that, since it takes time to calculate a reduced size per clipped image, a method of preparing in advance a table describing values of reduces sizes with use of clip positions as parameters and referring to the table can be employed.

FIG. 11 illustrates an example of a table describing a relation between positions of a clipped image and reduced image sizes. In this table, positions x of a clipped image in the horizontal direction are classified in the horizontal direction, positions y of a clipped image in the vertical direction are classified in the vertical direction, and appropriate reduced image sizes to the clip positions (x, y) derived in FIGS. 10A to 10D are described. By referring to a corresponding position in the table based on positional information of a clipped image transmitted from the external information detection unit 1, the reduced size determination unit 2 can derive a reduced image size easily and promptly.

FIGS. 12A and 12B illustrates plans to determine a reduced size for a clip position. There exist two determination plans FIGS. 12A and 12B in accordance with the priority of required recognition performances. In each of the graphs, the horizontal axis represents the coordinate x of the clipped image in the horizontal direction while the vertical axis represents the reduced image size.

In FIG. 12A, the clip position and the reduced size are in a relation in which, as the clip position x is closer to the center, the reduced size increases (similar to FIGS. 10A to 10D). Thus, improvement in the recognition accuracy at the center of the road can be prioritized (accuracy priority), but the recognition process time is extended instead.

Conversely, in FIG. 12B, the clip position and the reduced size are in a relation in which, as the clip position x is closer to the center, the reduced size decreases. Thus, improvement in the recognition speed at the center of the road can be prioritized (speed priority), but the recognition accuracy is lowered instead.

Which of the above determination plans FIGS. 12A and 12B is to be employed should be determined as appropriate in consideration of which of the recognition performances (the recognition accuracy and the recognition speed) is to be prioritized based on the kind of the target to which the image recognition system is applied, that is, the object, and the driving situation.

<Case 3> Case where Reduction Determination Parameter is Distance to Object

In Case 3, a case where the reduced size determination unit 2 determines a reduced image size based on a distance from the subject car to an object (a target to be recognized) in a clipped image will be described.

FIGS. 13A and 13B illustrate an example of information (Data B) transmitted from the external information detection unit 1 to the reduced size determination unit 2. FIG. 13A illustrates an example of a frame image transmitted from the external information detection unit 1 and includes similar clipped images (Objects 1, 2, and 3) to those in FIG. 3A or FIG. 9A.

FIG. 13B illustrates additional data of the clipped images and describes distances d (distances) from the subject car to the objects in the clipped images. Each distance d between the car and the object may be calculated from a disparity of the stereo camera 12 or acquired from the car-mounted radar 13.

FIGS. 14A and 14B illustrate an example of a reduced size determined by the reduced size determination unit 2. The graph in FIG. 14A illustrates a reduced size determination curve. The horizontal axis represents a distance d (distance) between the car and an object while the vertical axis represents a reduced image size (reduced size). As illustrated in this curve, as the distance d to the object is shorter, the reduced size is larger to raise the recognition accuracy. For example, in a case where the distance d to the object is 14 m (Object 3 in FIGS. 13A and 13B), the reduced size is derived as $0.35 \times 10^5$ pixels as illustrated by the arrows.

FIG. 14B illustrates an example of a table describing a relation between distances to an object and reduced image sizes. In this table, distances are classified, and appropriate reduced image sizes derived in FIG. 14A are described. By referring to a corresponding position in the table based on information about a distance from the car to the object transmitted from the external information detection unit 1, the reduced size determination unit 2 can derive a reduced image size easily and promptly.

Figure 15A:
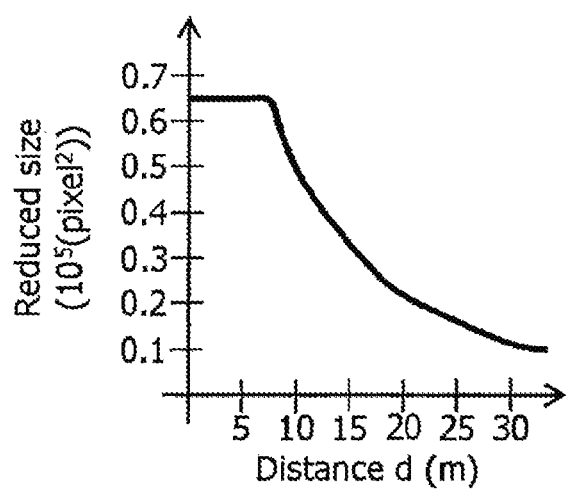
FIGS. 15A and 15B illustrate plans to determine a reduced size.
Figure 15B:
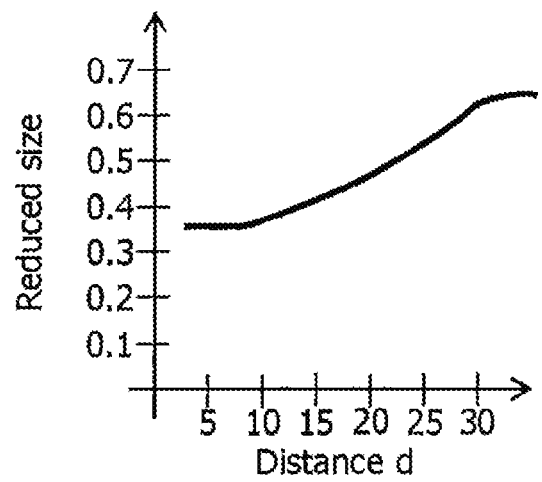

FIGS. 15A and 15B illustrate plans to determine a reduced size for a distance to an object. There exist two determination plans FIGS. 15A and 15B in accordance with the priority of required recognition performances. In each of the graphs, the horizontal axis represents a distance d to an object while the vertical axis represents the reduced image size.

In FIG. 15A, the distance and the reduced size are in a relation in which, as the distance to the object is shorter, the reduced size increases (similar to FIGS. 14A and 14B). Thus, the recognition accuracy for an object having a shorter distance to the car can be raised (accuracy priority).

Conversely, in FIG. 15B, the distance and the reduced size are in a relation in which, as the distance to the object is shorter, the reduced size decreases. Thus, the recognition speed for an object having a shorter distance to the car can be raised (speed priority).

<Case 4> Case where Reduction Determination Parameters are Distance and Direction with Respect to Object Case 4 is a modification of Case 3 described above. In Case 4, a case where the reduced size determination unit 2 determines a reduced image size based on, in addition to a distance to an object (a target to be recognized), a direction in which the object exists will be described.

FIGS. 16A to 16C illustrate an example of information (Data B) transmitted from the external information detection unit 1 to the reduced size determination unit 2. A frame image transmitted from the external information detection unit 1 is similar to that in FIG. 13A. FIG. 16A illustrates additional data of the clipped images and describes distances d (distances) from the subject car to the objects (Objects 1 to 3) in the clipped images and directions (directions) of the objects. Each distance and each direction with respect to the object may be calculated from a disparity of the stereo camera 12 or acquired from the car-mounted radar 13.

FIGS. 16B and 16C illustrate an example of a way to derive a direction of the object with respect to the subject car. To define the direction as a solid direction, the direction is expressed by two angles $\phi$ and $\theta$. First, as illustrated in FIG. 16B, with a front center (center) of the car as a start point, a vector Vm (direction of movement) in a traveling direction of the car is defined. Subsequently, as illustrated in FIG. 16C, a vector V connecting the front center (center) of the car to the object (object) is defined. Subsequently, a plane S perpendicularly intersecting with the vector Vm in the traveling direction of the car is defined, and a projection vector V', of the vector V connecting the front center of the car to the object, to the plane S, is derived. An angle between the vector V connecting the front center of the car to the object and a reference line L predetermined in the plane S is defined as the angle $\phi$. Also, an angle between the vector V connecting the front center of the car to the object and the vector Vm in the traveling direction of the car is defined as the angle $\theta$. For example, in a case where the reference line L is a line drawn upward from the front center (center) of the car, the angle $\phi$ indicates how much the object is inclined from the traveling direction in the right-and-left direction, and the angle $\theta$ indicates how much the solid angle of the object is inclined from the traveling direction. In this manner, by deriving the angles $\phi$ and $\theta$, the direction of the object with respect to the car can be derived uniquely.

In the above example, the distance and the direction of the object with respect to the car are expressed in so-called polar coordinates. However, how the distance and the direction are expressed is not limited to the above example as long as the expression is one that enables the distance and the direction of the object with respect to the car to be expressed uniquely. For example, the distance and the direction of the object may be expressed directly with use of three-dimensional coordinates (a height, a width, and a depth) from a reference point of the car.

Figure 17A:
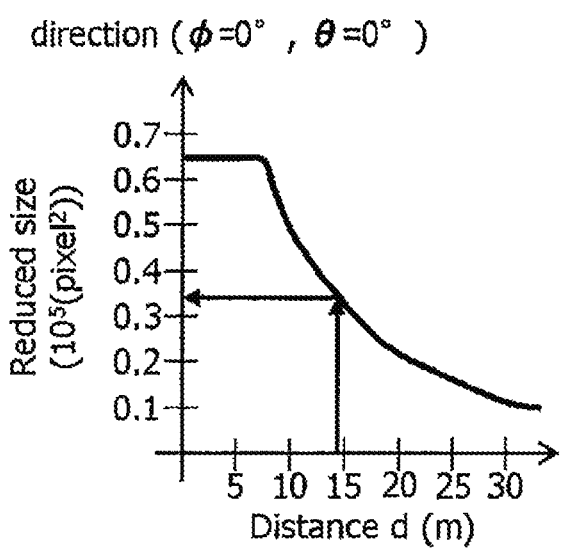
FIGS. 17A to 17C illustrate graphs each illustrating a relation between a distance and a direction with respect to an object and a reduced size.
Figure 17B:
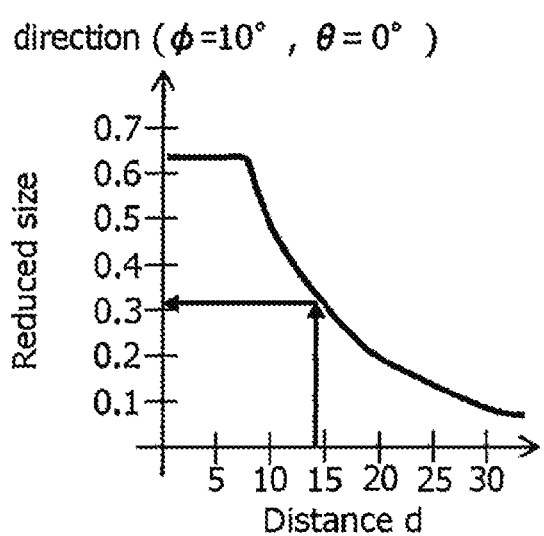
Figure 17C:
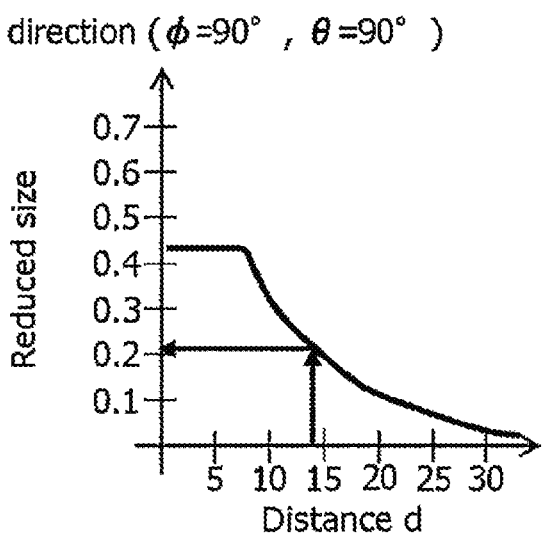

FIGS. 17A to 17C illustrate graphs illustrating examples of reduced sizes determined by the reduced size determination unit 2. The graphs in FIGS. 17A to 17C illustrate reduced size determination curves in a case where the direction ($\phi$, $\theta$) between the car and the object is (0°, 0°), (10°, 0°), and (90°, 90°). The horizontal axis represents a distance d (distance) between the car and an object while the vertical axis represents a reduced image size (reduced size). In this manner, a reduced image size depends not only on the distance d bust also on the direction ($\phi$, $\theta$) between the car and the object. The reason for this is as follows. For example, as in FIG. 17A, when the object is an extension of the traveling direction of the car, the car will highly probably collide with the object as the car keeps proceeding. On the other hand, as in FIG. 17C, when the object is in a direction perpendicular to the traveling direction of the car, the car will be unlikely to collide with the object even in a case where the car keeps proceeding. Thus, even in a case where the distances d between the car and the object are the same, the required recognition accuracy differs depending on the direction. For this reason, the reduced image size is varied.

FIGS. 18A and 18B illustrate an example of tables describing a relation between distances and directions with respect to an object and reduced image sizes. In this case, since there are three parameters (a distance, $\phi$, and $\theta$), a configuration in which tables are referred to in two stages is employed. FIG. 18A illustrates an example of a table ($1^{st}$ table) to be referred to in the first stage. In this table, values of angles $\phi$ are classified in the horizontal direction, values of angles $\theta$ are classified in the vertical direction, and ID numbers (table IDs) of a table ($2^{nd}$ table) to be referred to in the second stage are described in corresponding positions. The reduced size determination unit 2 determines an ID number of the table to be referred to in the second stage based on information about a direction ($\phi$, $\theta$) of an object transmitted from the external information detection unit 1.

FIG. 18B illustrates an example of a group of tables ($2^{nd}$ table) to be referred to in the second stage. For example, in a case where the angles fall into $\phi$=0° to 10° and $\theta$=0° to 10° in the first stage, a table of ID=9 is referred to. In each of the tables in the second stage, distances d to an object are classified based on the reduced size determination curves in FIGS. 17A to 17C, and values of reduced sizes are described. The reduced size determination unit 2 can refer to a corresponding position in the table based on information about the distance d to the object transmitted from the external information detection unit 1 and derive a reduced image size easily.

In FIGS. 18A and 18B, the configuration in which the tables are referred to in two stages is employed. However, the table reference may be performed only in one stage, and in the other stage, the calculation based on the reduced size determination curve in FIGS. 17A to 17C may be performed.

<Case 5> Case where Reduction Determination Parameter is Time until Collision with Object In Case 5, as a modification of Case 3 described above, a case where the reduced size determination unit 2 determines a reduced image size based on a velocity of the subject car and a velocity of an object as well as a distance to the object (target to be recognized), that is, based on time until the subject car collides with the object, will be described.

Figure 19A:
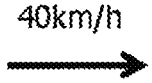
FIGS. 19A to 19C illustrate an example of information transmitted from the external information detection unit 1<Case 5>.
Figure 19B:
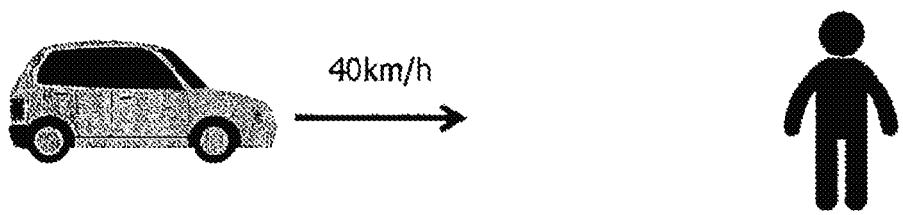
Figure 19C:

FIGS. 19A to 19C illustrate an example of information (Data B) transmitted from the external information detection unit 1 to the reduced size determination unit 2. FIG. 19A illustrates additional data of clipped images and describes distances d (distances) to respective objects (Objects 1 to 3) and time Tc (time to collide) until the car and each of the objects collide in a case where the car and the object keep proceeding. Thus, the external information detection unit 1 calculates time Tc until collision based on the distance d between the car and the object and the velocity of the car and the velocity of the object. The velocity of the car can be calculated based on information about the distance or the like obtained from the car-mounted speedometer 11, and the velocity of the object can be calculated based on information about the distance or the like obtained movie data captured by the stereo camera 12 and the car-mounted radar 13. Meanwhile, the additional data transmitted from the external information detection unit 1 to the reduced size determination unit 2 may be only the velocities of the car and the object, and the time Tc until the car and the object collide may be calculated in the reduced size determination unit 2.

In calculating the time Tc until the car and the object collide, in a case where the object (a pedestrian in FIG. 19B) almost stands still as in FIG. 19B, only the velocity of the car has to be considered. In a case where the object (a bicycle in FIG. 19C) is running as in FIG. 19C, the velocities of both the car and the object are considered, and the time is calculated from a relative velocity thereof, to achieve more accurate calculation.

Figure 20A:
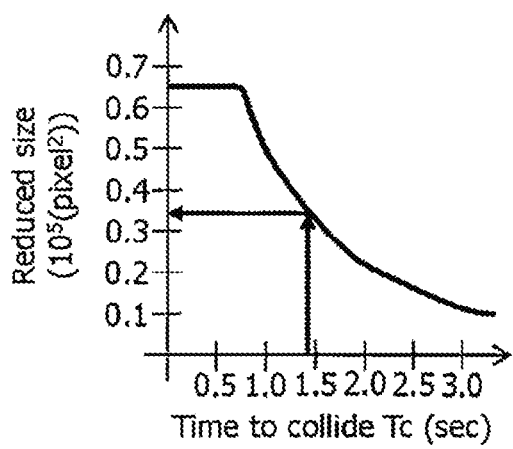
FIGS. 20A and 20B illustrate graphs each illustrating a relation between time until collision with an object and a reduced size.
Figure 20B:
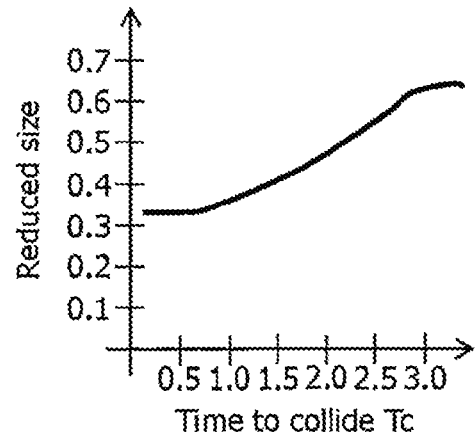

FIGS. 20A and 20B illustrate graphs illustrating an example of a reduced size determined by the reduced size determination unit 2. In each of the graphs, the horizontal axis represents time Tc until collision with an object while the vertical axis represents the reduced image size (reduced size). There exist two plans FIGS. 20A and 20B to determine the reduced size.

FIG. 20A illustrates a case where the recognition accuracy is prioritized (accuracy priority). As the time Tc until collision with the object is shorter, the reduced size increases. Conversely, FIG. 20B illustrates a case where the recognition speed is prioritized (speed priority). As the time Tc until collision with the object is shorter, the reduced size decreases, and the time for a recognition process is shortened.

<Case 6> Case where Reduction Determination Parameter is Number of Object

In Case 6, as a modification of Case 1 (an original size of a clipped image), Case 2 (a clip position of an image), and Case 3 (a distance to an object) described above, a case where the reduced size determination unit 2 determines a reduced image size in consideration of the number of objects (targets to be recognized) will be described.

Figure 21A:
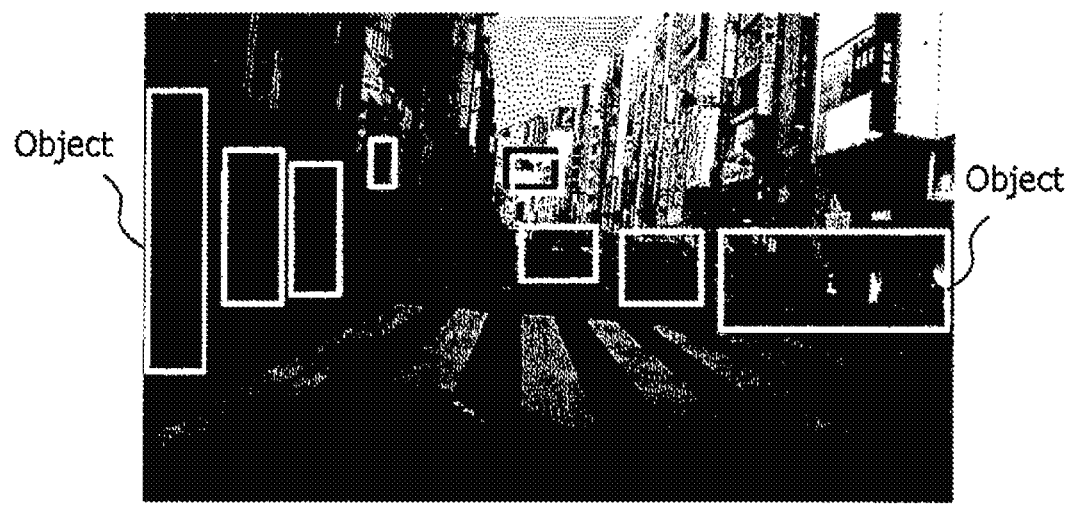
FIGS. 21A and 21B illustrate examples of images having different numbers of objects <Case 6>.
Figure 21B:
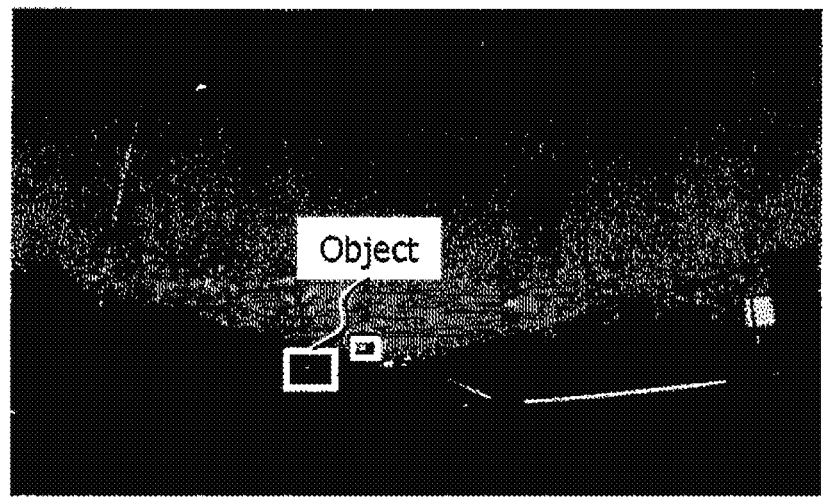

FIGS. 21A and 21B illustrate each of states in which one frame to be subject to a recognition process is clipped from a movie that the external information detection unit 1 has acquired by means of the stereo camera 12, and in which objects (objects) included in the frame image are clipped (a clipped image).

FIG. 21A illustrates an example in which the place is a downtown area, and FIG. 21B illustrates an example in which the place is a highway. When these places are compared, the number N of objects (object number) indicated by frames is large in the downtown area in FIG. 21A and is small in the highway in FIG. 21B. In the downtown area, there are many people and cars, and traffic lights are provided at regular intervals. On the other hand, in the highway, there are normally no people or traffic lights, and no objects exist except lines on the road and a few cars. In this manner, in a case where the number N of objects differs, the number of objects per frame, that is, the number of objects that must be recognized per unit time, differs. Thus, recognition time per clipped image, that is, an optimal reduced size, differs.

Figure 22A:
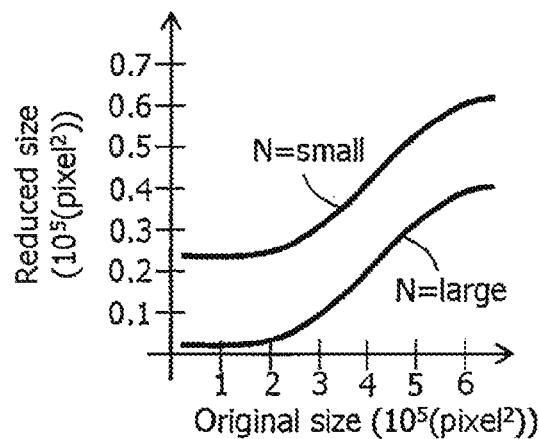
FIGS. 22A to 22F illustrate graphs each illustrating a relation with a reduced size in consideration of the number of objects.
Figure 22B:
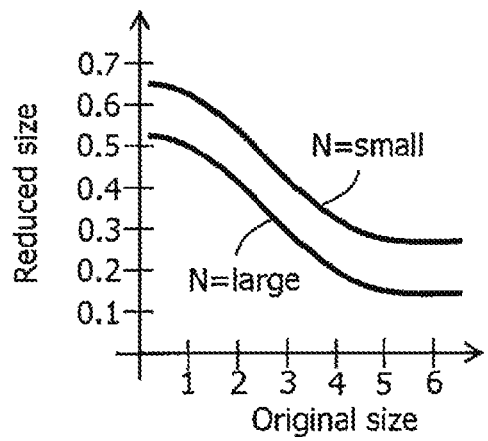
Figure 22C:
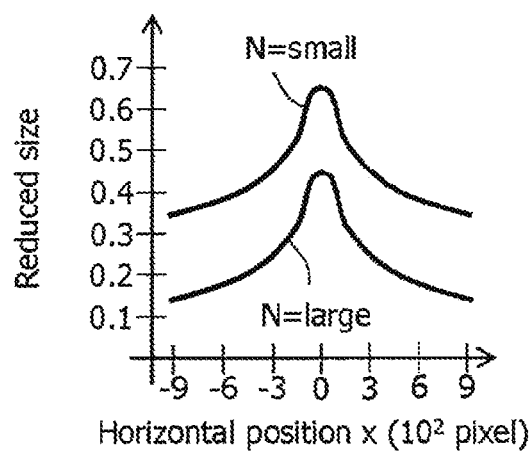
Figure 22D:
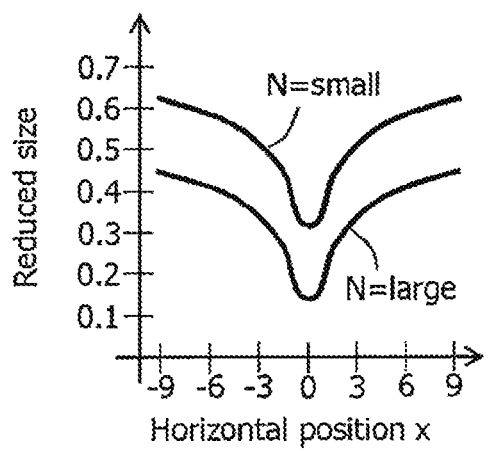
Figure 22E:
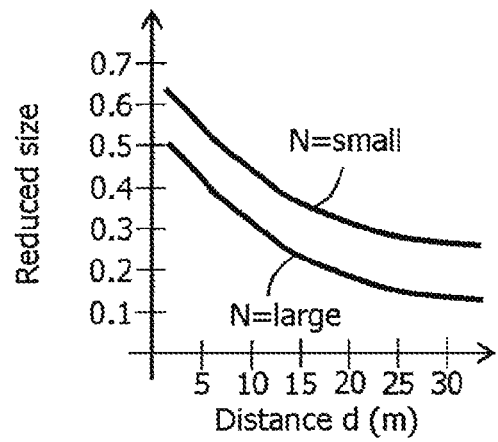
Figure 22F:
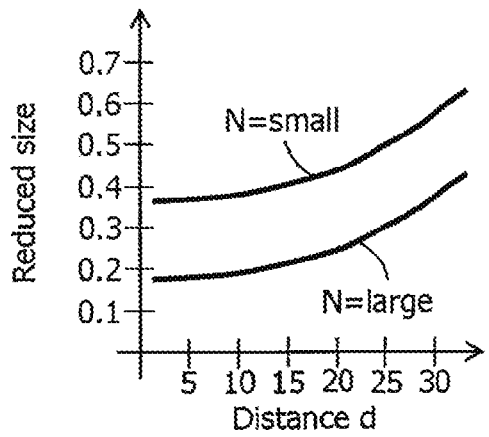

FIGS. 22A to 22F illustrate graphs illustrating an example of a reduced size determined by the reduced size determination unit 2. The reduced size determination unit 2 can obtain the number N of objects included in one frame, or the number N of clipped images including the objects, from Data B transmitted from the external information detection unit 1. The reduced size determination unit 2 then determines a reduced size in consideration of the number N of objects. FIGS. 22A and 22B illustrate reduced size determination curves in Case 1 described above. FIG. 22A illustrates a case where the recognition accuracy is prioritized while FIG. 22B illustrates a case where the recognition speed is prioritized with an original size of an image represented in the horizontal axis. Graphs FIGS. 22C and 22D illustrate reduced size determination curves in Case 2 described above. The graph FIG. 22C illustrates a case where the recognition accuracy is prioritized while the graph FIG. 22D illustrates a case where the recognition speed is prioritized with a clip position of an image (a position x in the horizontal direction) represented in the horizontal axis. Graphs FIGS. 22E and 22F illustrate reduced size determination curves in Case 3 described above. The graph FIG. 22E illustrates a case where the recognition accuracy is prioritized while the graph FIG. 22F illustrates a case where the recognition speed is prioritized with a distance d to an object represented in the horizontal axis.

In each of the reduced size determination curves, in a case where the number of objects is large (N=large), the reduced image size is smaller (the curve shifts downward) than that in a case where the number of objects is small (N=small) even when the value in the horizontal axis (such as the original size of the image, the clip position x of the image, and the distance d to the object) is the same. The reason for this is that, in a case where the number of objects is large, recognition process time per object is shortened to complete the entire recognition process within a predetermined time frame. A threshold value for whether the number of objects is large or small may arbitrarily be set in accordance with the recognition process capability of the system, and images may be classified into three or more levels based on the number of objects.

Also, as described in FIGS. 21A and 21B, since whether the number of objects is large or small is related to a place of traveling (the downtown, the highway, or the like), whether the number of objects is large or small may be determined from geographical information transmitted from the external information detection unit 1 instead of the number N of objects.

According to Embodiment 1, in image recognition, an image to be recognized is reduced to an optimal size based on a size and a shape of the image to be recognized, a clip position of the image, a distance to an object, and the like, and recognition process units are provided for respective image sizes. Accordingly, the number of times of operation required for a recognition process and the capacity of the memory can be reduced, and image recognition can be performed with low power and at high speed.

The cases in which various additional data is used as reduction determination parameters (Case 1 to Case 6) have been described above. In a case where the present embodiment is applied to the autonomous driving system, optimal parameters (size conversion table) may be selected or combined to fit with the driving condition. For example, by automatically selecting an optimal reduced size determination curve from conditions such as a place in which the car is traveling, a car velocity, and a surrounding environment (brightness), a more efficient recognition process can be performed.

Embodiment 2

In Embodiment 2, from additional data of a clipped image to be recognized, required recognition accuracy and required recognition speed for the image are determined, and the image is reduced to an image size appropriate for these requirements.

Figure 23:
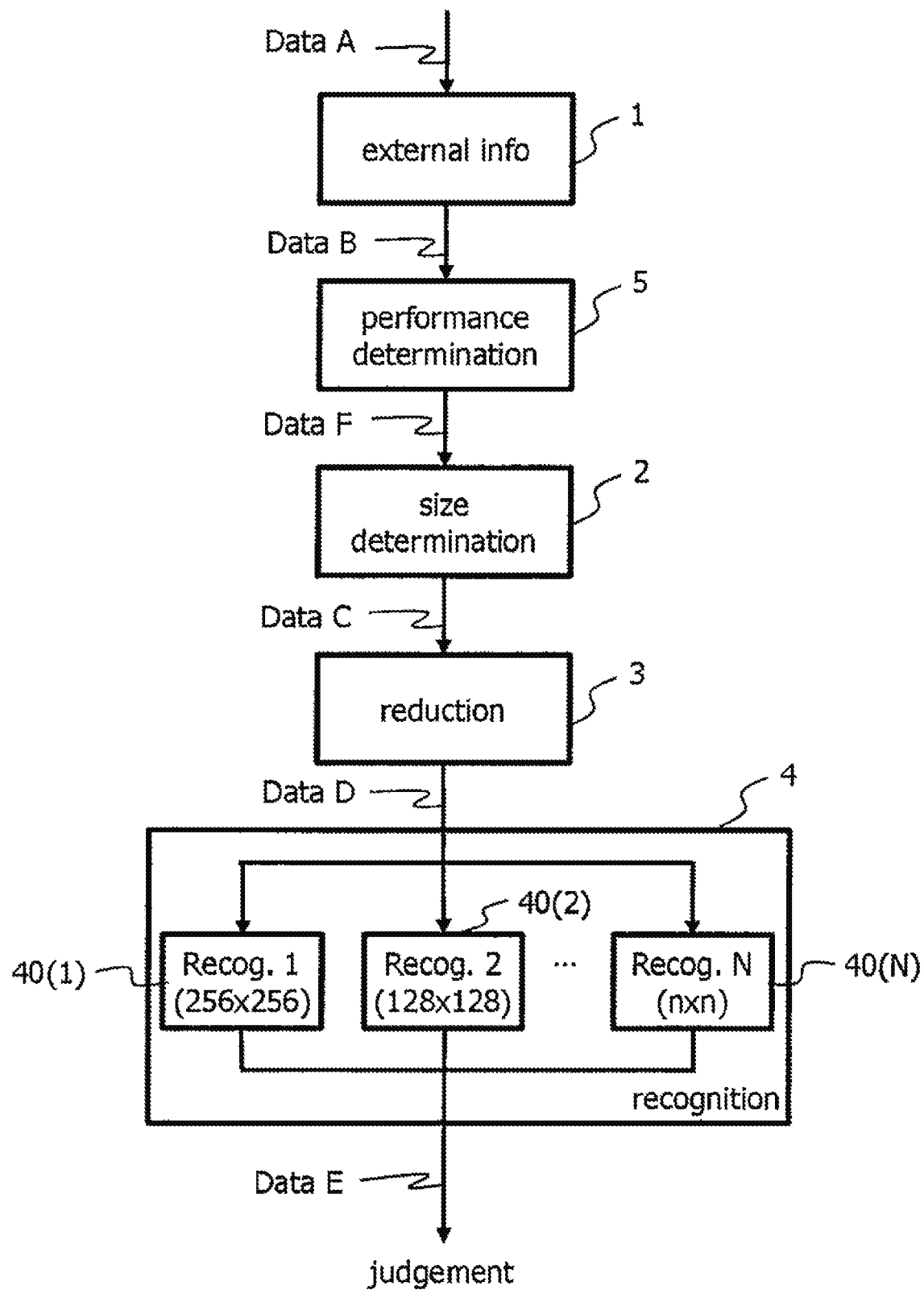
FIG. 23 illustrates a configuration of the image recognition system according to Embodiment 2.

FIG. 23 illustrates a configuration of the image recognition system according to Embodiment 2. The image recognition system 10 basically includes the components in Embodiment 1 (FIG. 2) and additionally includes a required recognition performance determination unit 5 (performance determination) between the external information detection unit 1 and the reduced size determination unit 2. The required recognition performance determination unit 5 determines required recognition accuracy and required recognition speed for a clipped image based on additional data from the external information detection unit 1. The reduced size determination unit 2 then determines a reduced size of the clipped image based on the required recognition accuracy and the required recognition speed determined in the required recognition performance determination unit 5. Hereinbelow, different points from those in FIG. 2 will be described.

Arrows illustrated in FIG. 23 represent directions in which data flows. Data A and Data B are similar to those in FIG. 2. Data F includes required recognition accuracy and required recognition speed for a clipped image per object extracted from a movie determined by the required recognition performance determination unit 5 based on clipped image data (image data before reduction) that the external information detection unit 1 has extracted from Data A and on Data B. Data D and Data E are similar to those in FIG. 2.

In Embodiment 2, the required recognition performance determination unit 5 does not need to use all additional data of the clipped image (information such as a size, a clip position, and a distance) in Data B but may use some of the data to determine the required recognition accuracy and the required recognition speed. Thus, there exist various cases in which the required recognition performance determination unit 5 determines the required recognition accuracy and the required recognition speed depending on which parameters out of the aforementioned information are to be used. Hereinbelow, a case where the required recognition performance determination unit 5 determines the required recognition accuracy and the required recognition speed with use of the parameters in Cases 1, 2, and 3 in Embodiment 1 and a method in which the reduced size determination unit 2 then determines the reduced size of the image will be described.

Figure 24A:
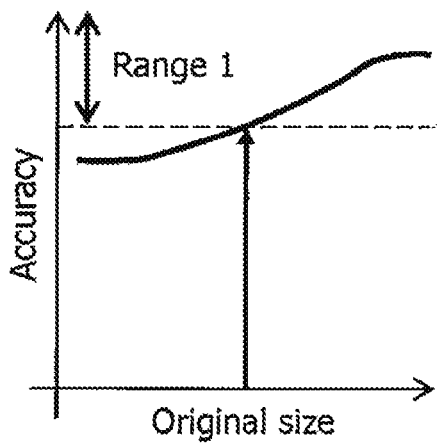
FIGS. 24A to 24F illustrate a method for determining required recognition accuracy and required recognition speed.
Figure 24B:
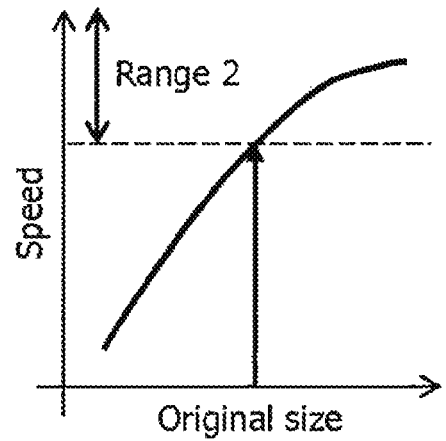
Figure 24C:
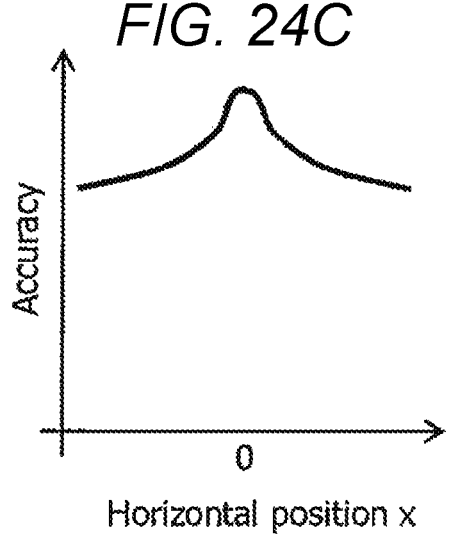
Figure 24D:
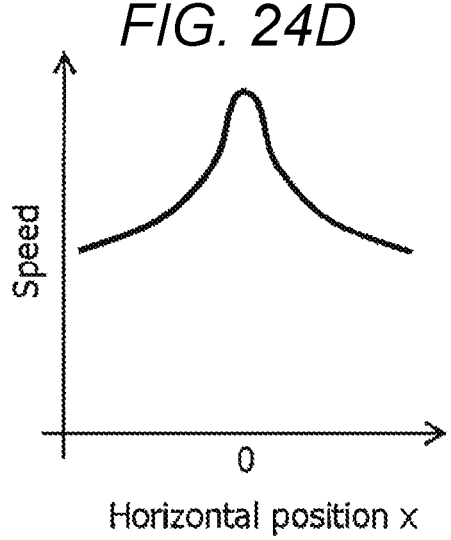
Figure 24E:
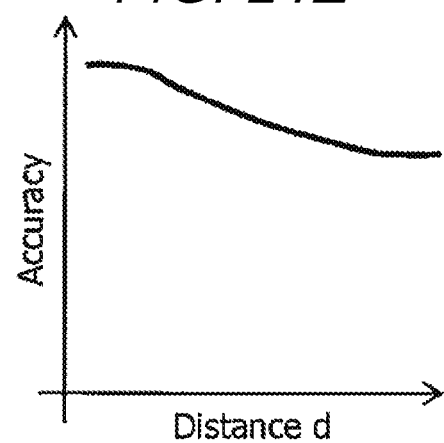
Figure 24F:
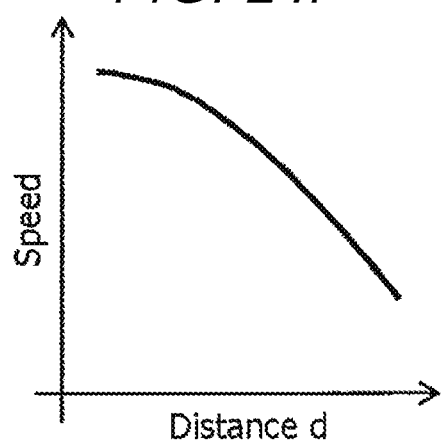

FIGS. 24A to 24F illustrate a method in which the required recognition performance determination unit 5 determines required recognition accuracy and required recognition speed. FIGS. 24A and 24B illustrate relations between an original size (original size) of a clipped image, and required recognition accuracy (accuracy) and required recognition speed (speed). FIGS. 24C and 24D illustrate relations between a coordinate x of a clip position in the horizontal direction (horizontal position), and required recognition accuracy and required recognition speed. FIGS. 24E and 24F illustrate relations between a distance d (distance) to an object, and required recognition accuracy and required recognition speed. A unit in each vertical axis, though it is omitted, is XX % or higher in the case of the required recognition accuracy and is YY images/sec or more (images/sec: the number of images to be recognized per unit time) in the case of the required recognition speed, each of which is a lower limit value.

Among these graphs, FIGS. 24A and 24B will be described. The required recognition performance determination unit 5 determines the required recognition accuracy (accuracy) and the required recognition speed (speed) as illustrated by the arrows with use of the predetermined relations in FIGS. 24A and 24B based on information about the original size (original size) of the clipped image transmitted from the external information detection unit 1. As a result, allowable ranges of the required recognition accuracy and the required recognition speed are calculated as Range 1 and Range 2, respectively. Similarly, allowable ranges of the required recognition accuracy and the required recognition speed are calculated with use of the predetermined relations in FIGS. 24C and 24D based on information about the coordinate x of the clip position of the image in the horizontal direction, and allowable ranges of the required recognition accuracy and the required recognition speed are calculated with use of the predetermined relations in FIGS. 24E and 24F based on information about the distance d to the object.

Further, allowable ranges of the required recognition accuracy and the required recognition speed may be calculated with use of other additional data such as a shape of a clipped image, a coordinate y of a clipped position in the vertical direction, a direction of an object, velocities of the car and an object, and the number of objects.

FIGS. 25A to 25E illustrate a method in which the reduced size determination unit 2 determines a reduced size of the image from the required recognition accuracy and the required recognition speed. FIG. 25A illustrates a relation between the required recognition accuracy (accuracy) and a reduced image size, and FIG. 25B illustrates a relation between the required recognition speed (speed) and a reduced image size.

With use of a relation curve in FIG. 25A, the reduced size determination unit 2 first calculates a range of a reduced image size (Size 1) that satisfies the required recognition accuracy as illustrated by the arrow based on the allowable range (Range 1) of the required recognition accuracy determined by the required recognition performance determination unit 5. With use of a relation curve in FIG. 25B, the reduced size determination unit 2 then calculates a range of a reduced image size (Size 2) that satisfies the required recognition speed as illustrated by the arrow based on the allowable range (Range 2) of the required recognition speed.

In practice, a way to manage the relations between the required recognition accuracy and the required recognition speed, and the reduced image sizes by means of tables illustrated in FIGS. 25C and 25D. FIG. 25C illustrates a table describing reduced image sizes corresponding to the required recognition accuracy, and the range of the reduced image size (Size 1) can easily be derived from the allowable range (Range 1) of the required recognition accuracy. Also, FIG. 25D illustrates a table describing reduced image sizes corresponding to the required recognition speed, and the range of the reduced image size (Size 2) can easily be derived from the allowable range (Range 2) of the required recognition speed.

Subsequently, the reduced size determination unit 2 derives an intersection of the two ranges (Size 1 and Size 2) of the reduced size determined above as illustrated in FIG. 25E. In the example illustrated in FIGS. 25A to 25E, the reduced image size in the intersection is in a range from 32×32 to 64×64 pixels. In this range, the reduced size determination unit 2 finally determines the reduced image size as 64×64 pixels in a case where the recognition accuracy is prioritized and as 32×32 pixels in a case where the recognition speed is prioritized.

According to Embodiment 2, required recognition accuracy and required recognition speed are derived from a size and a shape of an image to be recognized, a clip position of the image, a distance to a captured object, and the like, the image to be recognized is reduced to an optimal size based on these information, and recognition process units are provided for respective image sizes. Accordingly, the number of times of operation required for a recognition process and the capacity of the memory can be reduced while the recognition accuracy and the recognition speed are maintained, and image recognition can be performed with low power and at high speed.

Embodiment 3

In Embodiment 3, when a plurality of clipped images are subject to a recognition process, priority of objects included in the respective images for the recognition process is set, and the recognition process is performed in the set order of priority.

Figure 26:
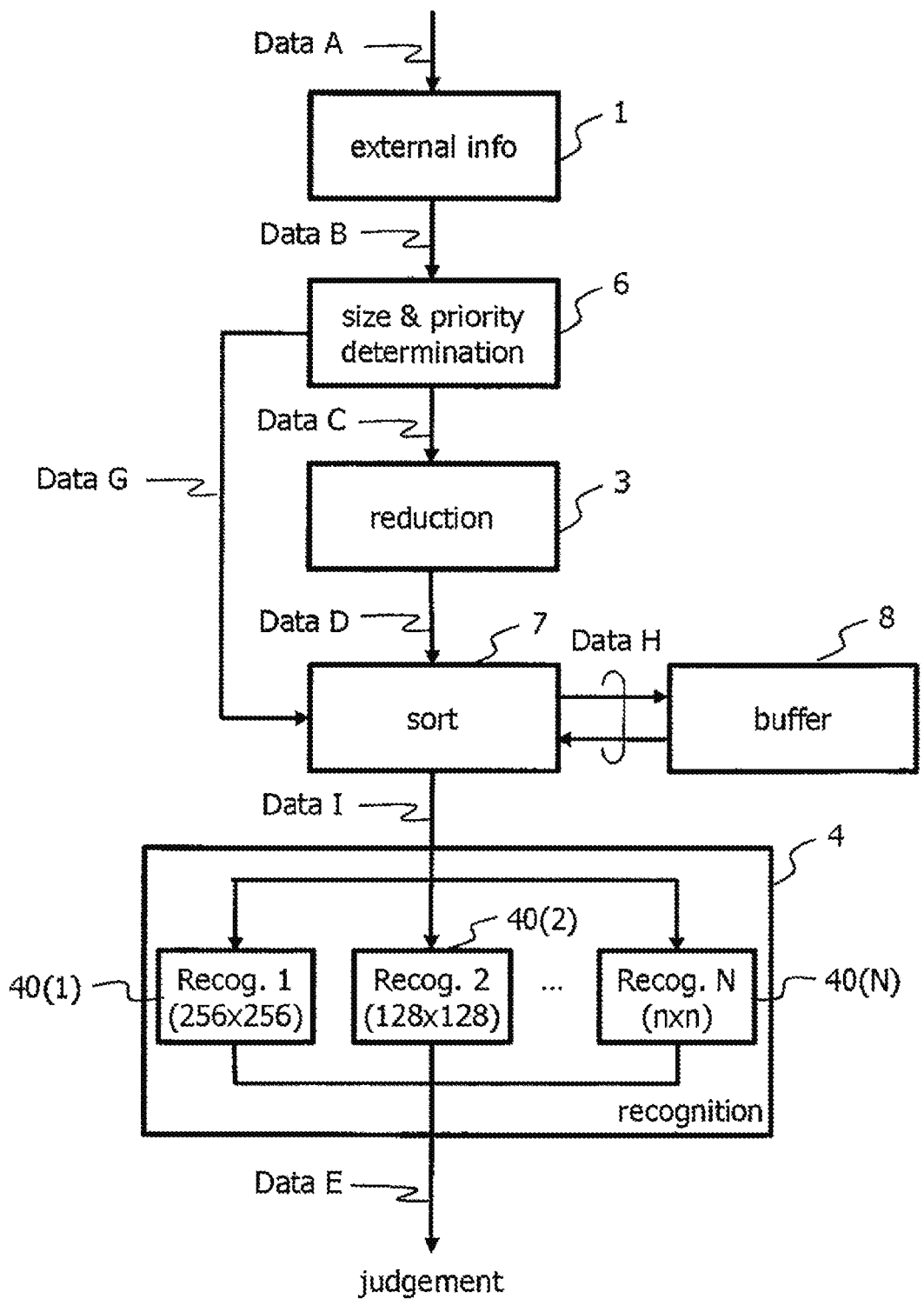
FIG. 26 illustrates a configuration of the image recognition system according to Embodiment 3.

FIG. 26 illustrates a configuration of the image recognition system according to Embodiment 3. The image recognition system 10 basically includes the components in Embodiment 1 (FIG. 2), includes a reduced size and priority determination unit 6 (size & priority determination) instead of the reduced size determination unit 2, and additionally includes a recognition process order sort unit 7 (sort) and an image buffer 8 (buffer) between the image reduction unit 3 and the image recognition unit 4.

The reduced size and priority determination unit 6 determines a reduced size of a clipped image in a similar manner to that of the reduced size determination unit 2 in Embodiment 1 (FIG. 2) and determines priority of objects included in respective clipped images for a recognition process. The recognition process order sort unit 7 sorts image data reduced by the image reduction unit 3 in accordance with the priority for a recognition process determined by the reduced size and priority determination unit 6. The image buffer 8 is a buffer that the recognition process order sort unit 7 uses in sorting the reduced image data.

Arrows illustrated in FIG. 26 represent directions in which data flows. Data A, Data B, and Data C are similar to those in FIG. 2, and Data C includes information about clipped image data and a reduced size for the clipped image. Data G includes information about the reduced size and priority for a recognition process determined by the reduced size and priority determination unit 6. Data D includes image data reduced by the image reduction unit 3. Data H includes image data that the recognition process order sort unit 7 reads from and writes in the image buffer 8. Data I includes reduced image data sorted in accordance with the priority. Data E includes a result of recognition in the image recognition unit 4.

Figure 27A:
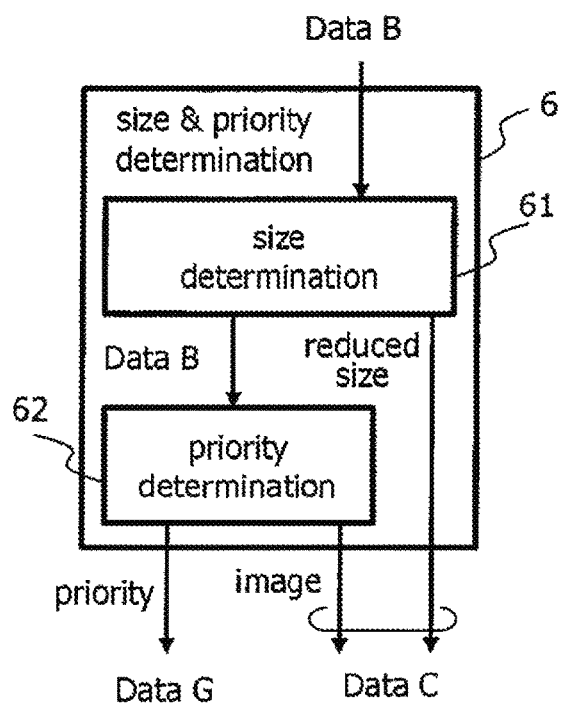
FIGS. 27A to 27C illustrate internal configuration examples of a reduced size and a priority determination unit 6.
Figure 27B:
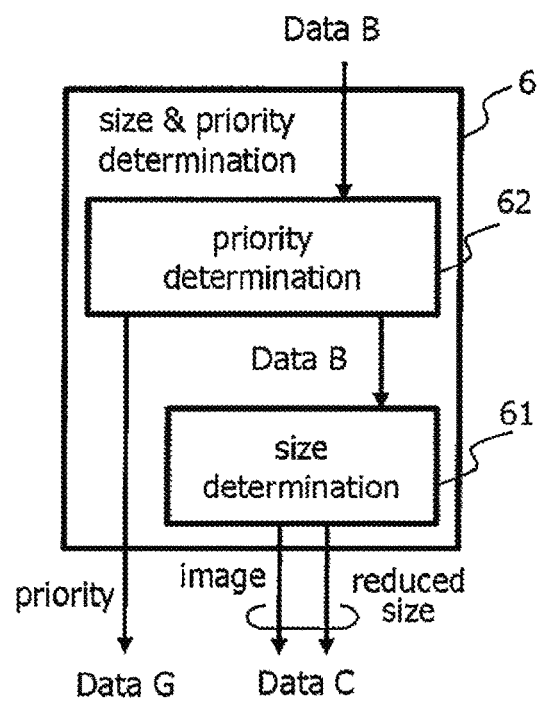
Figure 27C:
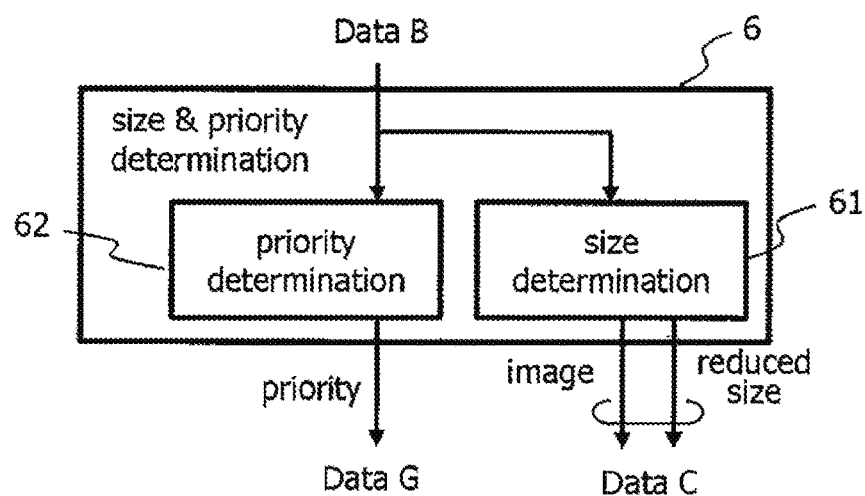

FIGS. 27A to 27C illustrate several internal configuration examples of the reduced size and priority determination unit 6. The reduced size and priority determination unit 6 includes a reduced size determination unit 61 (size determination) and a priority determination unit 62 (priority determination). The reduced size determination unit 61 (size determination) is operated in a similar manner to that of the reduced size determination unit 2 in FIG. 2.

In the example in FIG. 27A, Data B input into the reduced size and priority determination unit 6 is first sent to the reduced size determination unit 61, in which reduced image sizes (reduced sizes) are determined. Subsequently, the priority determination unit 62 determines priority (priority) of clipped images for a recognition process based on Data B received from the reduced size determination unit 61 and sends the priority as Data G to the recognition process order sort unit 7. The clipped images (images) output by the priority determination unit 62 and the reduced image sizes output by the reduced size determination unit 61 are combined into Data C, and Data C is sent to the image reduction unit 3. In this configuration, since the reduced sizes of the clipped images are derived in an early stage, an image reduction process can be executed in the subsequent image reduction unit 3 in an early stage.

In the example in FIG. 27B, Data B input into the reduced size and priority determination unit 6 is first sent to the priority determination unit 62, in which priority of clipped images for a recognition process is determined. The determined priority for a recognition process is sent as Data G to the recognition process order sort unit 7. Subsequently, the reduced size determination unit 61 determines reduced image sizes based on Data B received from the priority determination unit 62. The reduced sizes and the clipped images are combined into Data C, and Data C is sent to the image reduction unit 3. In this configuration, since the priority for a recognition process is derived in an early stage, a sort process can be executed in the recognition process order sort unit 7 in an early stage.

In the example in FIG. 27C, Data B input into the reduced size and priority determination unit 6 is sent to both the reduced size determination unit 61 and the priority determination unit 62. In the priority determination unit 62, priority of clipped images for a recognition process is determined, and the priority is sent as Data G to the recognition process order sort unit 7. In the reduced size determination unit 61, reduced image sizes are determined. The reduced image sizes and the clipped images are combined into Data C, and Data C is sent to the image reduction unit 3. In this configuration, both the reduced sizes of the clipped images and the priority for a recognition process are derived in an early stage. However, since the reduced size determination unit 61 and the priority determination unit 62 are operated at the same time, power consumption and required calculation resources increase further than in the examples in FIGS. 27A and 27B.

Which of the configurations in FIGS. 27A to 27C is selected is determined based on process speed and a circuit size of each of the reduced size determination unit 61 and the priority determination unit 62, process speed and a circuit size of each of the image reduction unit 3 and the recognition process order sort unit 7 on the downstream side, entire balance of the process speeds, an entire circuit size, power consumption, and the like.

Meanwhile, when the reduced size determination unit 61 and the priority determination unit 62 determine the reduced image sizes and the priority for a recognition process, the reduced size determination unit 61 and the priority determination unit 62 do not use the clipped image data itself but use additional data of the images (an original size, a shape, a distance, and the like). Thus, in the above examples, the clipped images are output from either the reduced size determination unit 61 or the priority determination unit 62, and which unit outputs the clipped images can be determined as appropriate. For example, in the example in FIG. 27A, the clipped image data may bypass input Data B and may be output directly, or the clipped image data may be output from the reduced size determination unit 61.

Also, in the examples illustrated in FIGS. 27A to 27C, a method in which the reduced size determination unit 61 determines the reduced size of the clipped image is similar to those described in Case 1 to Case 6 in Embodiment 1. That is, a relation between information of Data B (an image size, a clip position, a distance, and the like) and a reduced image size is determined in advance, and a reduced image size is determined based on the relation by reference of a table, simple calculation, or the like.

Figure 28A:
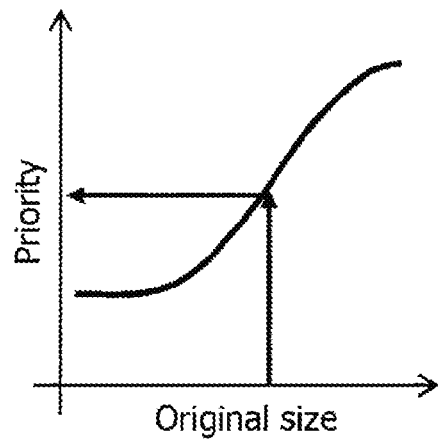
FIGS. 28A to 28C illustrate a method for determining priority for a recognition process.
Figure 28B:
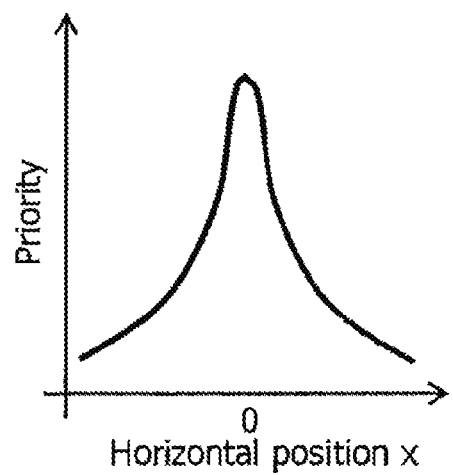
Figure 28C:
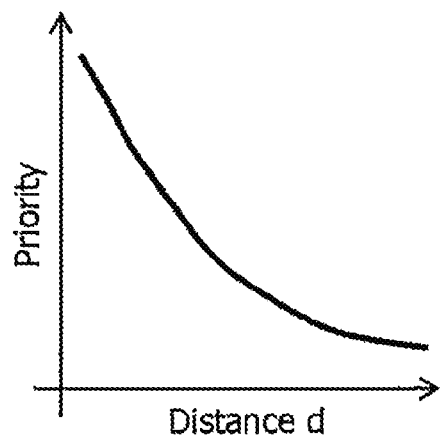

FIGS. 28A to 28C illustrate a method in which the priority determination unit 62 determines priority for a recognition process. FIGS. 28A to 28C illustrate relations with priority (priority) for a recognition process with an original size (original size) of a clipped image, a coordinate x of an image clip position in the horizontal direction (horizontal position), and a distance d (distance) to an object on the horizontal axes, respectively. In each graph, the priority on the vertical axis means that the priority is higher in the upper direction of the drawing sheet.

FIG. 28A illustrates a case of determining the priority for a recognition process from the original size of the clipped image. As illustrated by arrows, a value of the priority corresponding to the original size of the clipped image is determined. In this example, as the original size of the image is larger, the distance from the subject car is highly probably shorter, and a recognition process of the image is prioritized more and is executed more quickly than those of other images. Also, the priority of a recognition process is set to be higher as the coordinate x of the image clip position in the horizontal direction is closer to the center in FIG. 28B, and as the distance d to the object is shorter in FIG. 28C.

Also, a method in which the priority determination unit 62 determines priority for a recognition process is not limited to this method. The priority for a recognition process may be set from a predetermined relation based on the various parameters (a shape of a clipped image, a coordinate of a clipped position in the vertical direction, a traveling direction of an object, velocities of the car and an object, the number of objects, and the like) described in the respective cases in Embodiment 1.

FIGS. 29A and 29B illustrate an example of a sort process by means of the recognition process order sort unit 7. A list "Input order" in FIG. 29A shows reduced image data transmitted from the image reduction unit 3 in order of reception in the recognition process order sort unit 7. For convenience of description, objects included in the image data are labeled with Object 1, 2, 3, . . . in order of reception. The order in which the reduced image data pieces are received is an order in which the image reduction unit 3 finishes the image reduction process. Naturally, the order is irrelevant to the priority for a recognition process. The recognition process order sort unit 7 gives the priority (priority) for a recognition process transmitted from the reduced size and priority determination unit 6 to each of the received image data pieces to prepare a list (Input order) representing a correspondence relation among the reduced image data pieces.

Subsequently, the recognition process order sort unit 7 stores the reduced image data pieces transmitted from the image reduction unit 3 in the image buffer 8 (buffer) in order of reception (order of Object 1, 2, 3, . . . ). When the number of objects included in the list "Input order" reaches a predetermined number, the recognition process order sort unit 7 executes a sort process (sorting) of the image data pieces in the list based on the priority values described in the list. As a result, as illustrated in a list "Output order" in FIG. 29B, the reduced image data pieces are sorted in descending order of priority value, that is, in descending order of priority. The recognition process order sort unit 7 reads out the reduced image data pieces from the image buffer 8 in order of the list "Output order" and sends the reduced image data pieces to the image recognition unit 4. In the above process, an image recognition process is executed in descending order of priority for recognition.

There are various ways to determine the timing at which the recognition process order sort unit 7 executes the sort process of the list (Input order). For example, the recognition process order sort unit 7 may execute the sort process when the number of image data pieces included in the list (Input order) exceeds a predetermined number, or the timing may be variable in consideration of balance between the progress of the image reduction process by means of the image reduction unit 3 and the progress of the image recognition process by means of the image recognition unit 4. Alternatively, a request to execute the sort process may be sent from the image reduction unit 3 and the image recognition unit 4 to the recognition process order sort unit 7. Alternatively, the recognition process order sort unit 7 may execute the sort process when the total size of the image data, not the number of image data pieces included in the list (Input order), exceeds a predetermined size.

In general, the number of times of calculation in a sort process is approximately N log N when the number of elements to be sorted (the number of image data pieces in the above example) is N. This means that, in a case where 10000 images are sorted, for example, the number of times of calculation is approximately one hundred thousand times. On the other hand, the number of times of calculation in the image recognition process is approximately hundreds of millions of times per image although the number of times depends on the reduced image size. Hence, an influence that the sort process newly added in the present embodiment has on the process time and the circuit size of the entire image recognition system is extremely small and is in a negligible level.

According to Embodiment 3, priority for a recognition process is determined from a size and a shape of an image to be recognized, a clip position of the image, a distance to an object, and the like, the image to be recognized is reduced to an optimal size, and recognition process units are provided for respective image sizes. Accordingly, while the entire recognition process is executed highly-responsively, the number of times of operation required for a recognition process and the capacity of the memory can be reduced, and image recognition can be performed with low power and at high speed.

Embodiment 4

In Embodiment 4, credibility of a recognition result provided by the image recognition unit 4 is checked. In a case where the credibility is determined to be low, the image reduction unit 3 reduces the image again so that the reduced image size may be larger, and the image recognition process is performed again.

Figure 30:
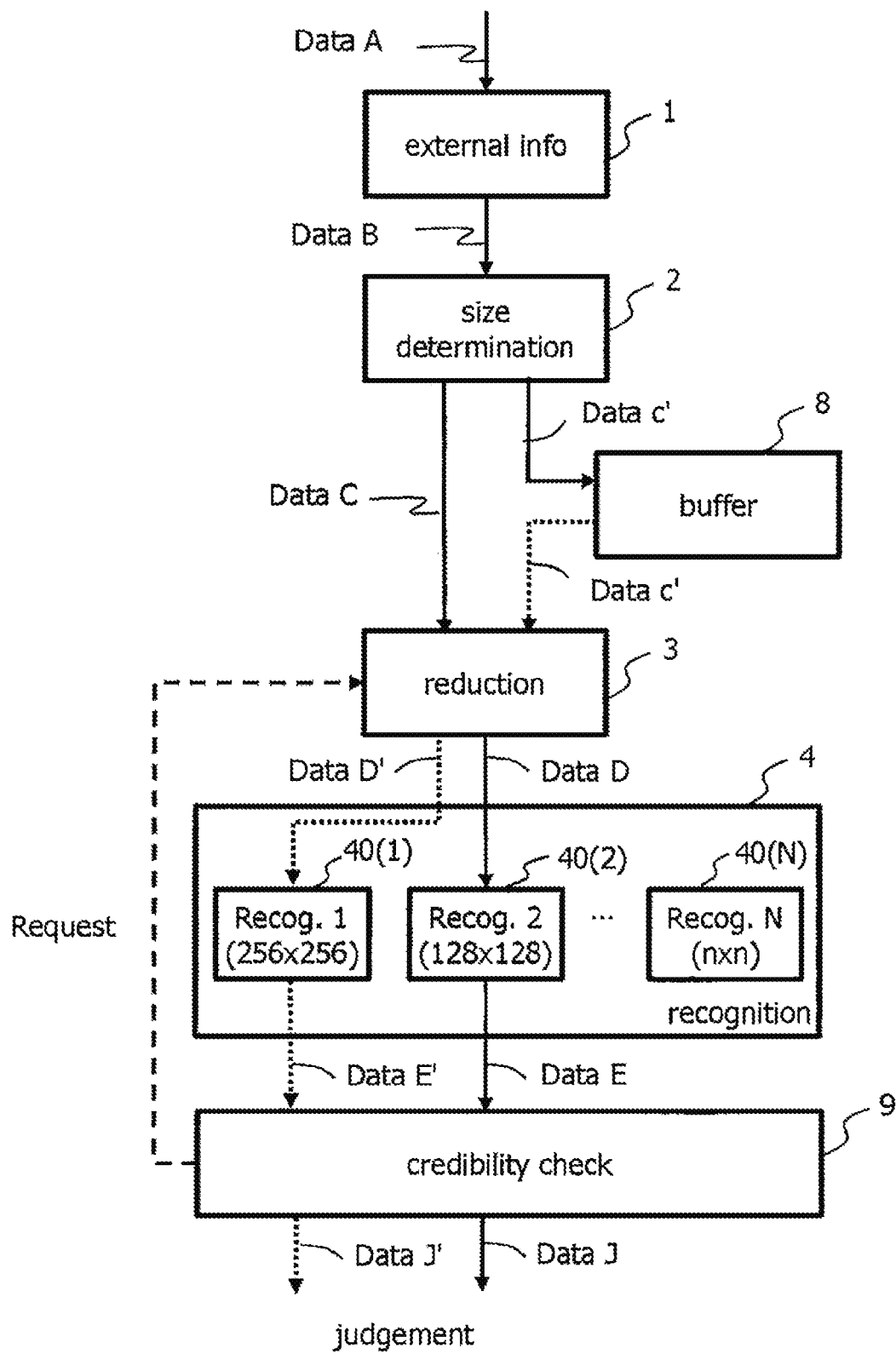
FIG. 30 illustrates a configuration of the image recognition system according to Embodiment 4.

FIG. 30 illustrates a configuration of the image recognition system according to Embodiment 4. The image recognition system 10 basically includes the components in Embodiment 1 (FIG. 2) and additionally includes the image buffer 8 (buffer) between the reduced size determination unit 2 and the image reduction unit 3 and a recognition result check unit 9 (credibility check) on the downstream side of the image recognition unit 4.

The image buffer 8 stores clipped image data before reduction transmitted from the reduced size determination unit 2 and is used when the image data undergoes a reduction process again. The recognition result check unit 9 checks credibility of a recognition result provided by the image recognition unit 4. In a case where the recognition result check unit 9 determines that the credibility is low, the recognition result check unit 9 issues a re-recognition process request (request) so that the reduced image size may be larger, and the image recognition process is performed again.

Arrows illustrated in FIG. 30 represent directions in which data flows. Solid arrows represent a data flow for a normal recognition process, and dashed arrows represent a data flow after the recognition result check unit 9 issues a re-recognition process request (request) for the image to the image reduction unit 3. Data A, Data B, and Data C are similar to those in FIG. 2, and Data C includes information about clipped image data and a reduced size for the clipped image. Data C' includes only the clipped image data, is stored in the image buffer 8, and is read out from the image buffer 8. Each of Data D and Data D' includes image data reduced by the image reduction unit 3. Each of Data E and Data E' includes a result of recognition in the image recognition unit 4. Each of Data J and Data J' includes a result of recognition finally determined by the recognition result check unit 9. Among these, Data D', Data E', and Data J' are data after the re-recognition process request (request) has been issued.

In this manner, the reduced size determination unit 2 sends the clipped image before reduction and the reduced image size as Data C to the image reduction unit 3 and also sends the clipped image before reduction as Data C' to the image buffer 8. The image before reduction (Data C') stored in the image buffer 8 is used by the image reduction unit 3 after the recognition result check unit 9 issues the re-recognition process request (request) for the image.

Next, operations of the re-recognition process will be described mainly about operations of the recognition result check unit 9.

Figure 31:
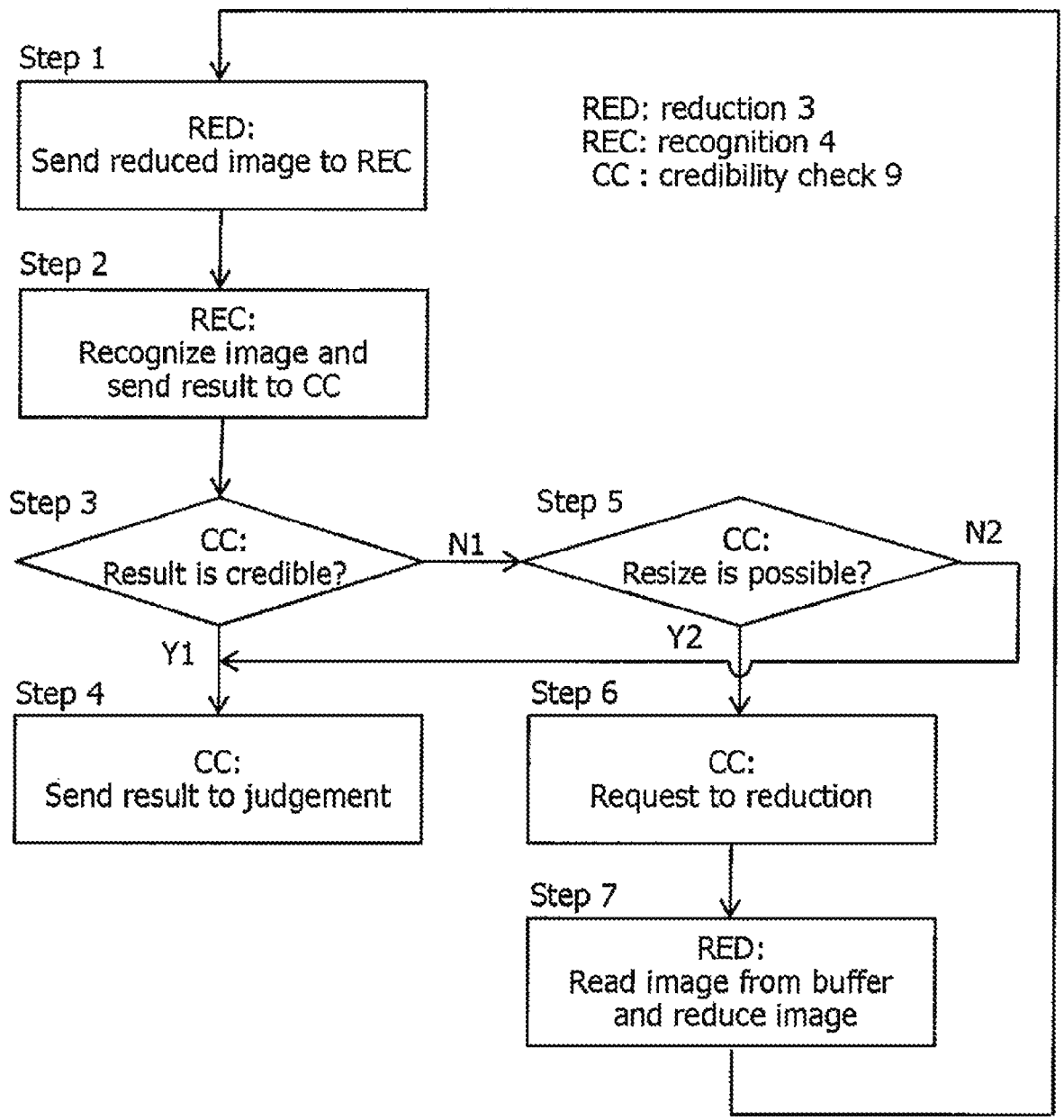
FIG. 31 is a flowchart illustrating a sequence of operations of a re-recognition process.

FIG. 31 is a flowchart illustrating a sequence of operations of the re-recognition process. First, the image reduction unit 3 (RED: reduction) sends a reduced image (Data D) to the image recognition unit 4 (REC: recognition) (Step 1). The image recognition unit 4, which receives the reduced image, performs a recognition process of the image with use of the recognition process unit 40(2), for example, and sends a recognition result (Data E) to the recognition result check unit 9 (CC: credibility check) (Step 2). The recognition result check unit 9 checks credibility of the send recognition result (Step 3). A method for checking credibility will be described below. In a case where it is determined that the credibility is high (Y1), the recognition result (Data J) is sent to the driving control units (the accelerator, the brake, the steering wheel, and the like) and is used for judgement of driving operations (Step 4). On the other hand, in a case where it is determined that the credibility is low (N1), the recognition result check unit 9 determines if the reduced image size can be enlarged and if the image recognition process can be executed again (Step 5).

In this example, since the image is reduced to 128×128 pixels and is processed by the recognition process unit 40(2), the image size can be enlarged from 128×128 pixels to 256×256 pixels, and the image recognition process can be executed by the recognition process unit 40(1) again. As in this example, in a case where it is determined that the reduced image size can be enlarged, and that the image recognition process can be executed again (Y2), the recognition result check unit 9 issues the re-recognition process request (request) to the image reduction unit 3 (Step 6). Conversely, in a case where it is determined that the reduced image size cannot be enlarged, and that the image recognition process cannot be executed again (N2), the current recognition result is sent to the driving control units (Step 4).

The image reduction unit 3, which receives the re-recognition process request (request) for the image, reads out the image before reduction (Data C') from the image buffer 8 and reduces the image again so that the reduced size may be larger than the previous reduced size (Step 7). Subsequently, the process returns to Step 1, and the image reduction unit 3 sends the image reduced again (Data D') to the image recognition unit 4. Thereafter, the aforementioned steps are repeated. The image recognition unit 4 causes the recognition process unit 40(1), for example, to perform the image recognition process again and sends a new recognition result (Data E') to the recognition result check unit 9. The recognition result check unit 9 checks credibility of the re-recognition result. In a case where it is determined that the credibility is high, the new recognition result (Data J') is sent to the driving control units.

In the above description, the recognition result check unit 9 sends the re-recognition process request (request) for the image to the image reduction unit 3. However, the recognition result check unit 9 may send the re-recognition process request to the reduced size determination unit 2. The reduced size determination unit 2, which has received the re-recognition process request, determines a larger reduced size than a previous reduced size and sends the reduced size to the image reduction unit 3 to enable a similar process.

FIGS. 32A to 32C describe a method in which the recognition result check unit 9 checks credibility of a recognition result (Step 3). FIG. 32A illustrates an example of a recognition result (result) to be sent from the image recognition unit 4 to the recognition result check unit 9. As the recognition result, probability values for respective categories (categories: car, pedestrian, and the like) are sent. Normally, a category (pedestrian in FIG. 32A) having the highest probability value among these probability values is a final recognition result. The credibility of the recognition result is an index of how much the final recognition result is credible.

For example, as in FIG. 32B, a probability value P2 of category 2 having the highest probability value and a probability value P1 of category 1 having the second highest probability value are compared. In a case where P2 is sufficiently higher than P1, it is judged that the probability that the object is truly category 2 is high (in other words, the credibility of the recognition result is high).

On the other hand, as in FIG. 32C, the probability value P2 of category 2 having the highest probability value and a probability value P6 of category 6 having the second highest probability value are compared. In a case where P2 is not sufficiently higher than P6, it is judged that the probability that the object is truly category 2 is lower than in the case in FIG. 32B (in other words, the credibility of the recognition result is low).

There are various ways for the recognition result check unit 9 to check credibility of a recognition result. For example, a ratio (P1/P2) or a difference (P1−P2) between the probability value P1 of the category having the highest probability value and the probability value P2 of the category having the second highest probability value is calculated, and in a case where the value is equal to or higher than a certain threshold value, it is judged that the probability of the recognition result is high. Alternatively, a ratio or a difference among a −1 probability values from a probability value of a category having the highest probability value to a probability value of a category having the a-th highest probability value may be calculated and compared with a threshold value. Alternatively, information entropy of a probability distribution of categories may be calculated and compared with a threshold value.

According to Embodiment 4, at the time of image recognition, an image to be recognized is reduced to an optimal size based on a size and a shape of the image to be recognized, a clip position of the image, a distance to a captured body, and the like, and credibility of a recognition result is fed back. Accordingly, while recognition accuracy is heightened, the number of times of operation required for image recognition and the capacity of the memory can be reduced, and image recognition can be performed with low power and at high speed. Consequently, it is possible to provide a system for recognizing an image and a movie at high speed even with limited electric power, logic scale, and memory capacity.

Also, as a modification example of Embodiment 4, a check result of the recognition result check unit 9 is learned, and for a case where it is judged that the credibility is low, the reduced size determination curve or table to be used in the reduced size determination unit 2 is modified to have a condition after reduction is performed again. Thus, a failure of a recognition process in a subsequent similar case can be reduced.

In the description of the above respective embodiments, the image recognition system is illustrated as a block diagram in which functions such as the external information detection unit, the reduced size determination unit, the image reduction unit, and the image recognition unit are separated. The present invention is not limited to this, and the functions may be implemented as a dedicated circuit such as an ASIC in a similar manner to the block diagram in which the functions are separated, may be implemented as a programmable logic such as an FPGA, may be implemented in an embedded microcomputer, or may be implemented as software operated on a CPU or a GPU. Alternatively, the functions may be implemented through combination of the above, in which case, the external information detection unit is an ASIC, and the reduced size determination unit is software, for example.

The present invention has been described above specifically with reference to the attached drawings. However, it is to be understood that preferred embodiments are not limited to those described above can be altered in various ways without departing from the scope of thereof.

What is claimed is:

1. An image recognition system performing a recognition process of at least one target to be recognized included in an image, the image recognition system comprising:
   an external information detection unit detecting a distance to the target to be recognized included in the image;
   a reduced image size determination unit deriving a reduced size of the image based on the distance to the target to be recognized detected in the external information detection unit, wherein the reduced size of the image decreases as the distance to the target to be recognized increases;
   an image reduction unit reducing the image based on the reduced size of the image derived in the reduced image size determination unit; and
   an image recognition unit including a plurality of recognition process units, each of which recognizes a different image size, and executing the recognition process of the target to be recognized included in the image reduced in the image reduction unit by means of the recognition process unit corresponding to a size of the image.

2. The image recognition system according to claim 1, wherein:
the external information detection unit detects a direction of the target to be recognized included in the image as well as the distance to the target to be recognized, and
the reduced image size determination unit derives a reduced size of the image based on the distance and the direction detected in the external information detection unit.

3. The image recognition system according to claim 1, wherein:
the image is captured by a camera mounted in a vehicle,
the external information detection unit detects at least one of a velocity of the vehicle and a velocity of the target to be recognized as well as the distance to the target to be recognized, and
the reduced image size determination unit derives a reduced size of the image based on the distance and the at least one of the velocity of the vehicle and the velocity of the target to be recognized detected in the external information detection unit.

4. The image recognition system according to claim 1, in a case where the plurality of targets to be recognized to be recognized in the image recognition unit exist, further comprising:
a recognition priority determination unit deriving priority for the recognition process of the images including the respective targets to be recognized based on the distances to the respective targets to be recognized detected in the external information detection unit; and
a recognition process order sort unit sending the images reduced in the image reduction unit to the image recognition unit in descending order of the priority derived by the recognition priority determination unit, wherein:
the image recognition unit executes the image recognition process of the reduced images sent from the recognition process order sort unit in descending order of the priority.

5. The image recognition system according to claim 1, further comprising:
a recognition result check unit receiving a result of image recognition by means of the image recognition unit and calculating credibility of the result of the image recognition, wherein:
in a case where the credibility calculated is lower than a threshold value, the recognition result check unit sends an image re-recognition request to the image reduction unit,
in a case where the image reduction unit receives the image re-recognition request, the image reduction unit reduces again the image before reduction into a larger size than a previous reduced size, and
the image recognition unit executes again the recognition process of the image reduced again in the image reduction unit.

6. The image recognition system according to claim 1, wherein:
the external information detection unit detects the total number of the images or the total number of the targets to be recognized included in the images as well as the distance to the target to be recognized, and
the reduced image size determination unit derives a reduced size of the image based on the distance and the total number of the images or the total number of the targets to be recognized detected in the external information detection unit.

7. The image recognition system according to claim 1, further comprising:
a required recognition performance determination unit deriving recognition accuracy and recognition speed required in the recognition process of the image based on the distance to the target to be recognized detected in the external information detection unit, wherein:
the reduced image size determination unit derives a reduced size of the image based on the recognition accuracy and the recognition speed derived in the required recognition performance determination unit.

8. An image recognition system performing a recognition process of at least one target to be recognized included in an image, the image recognition system comprising:
an external information detection unit detecting a size and a shape of the image;
a reduced image size determination unit deriving a reduced size of the image based on the size and the shape of the image detected in the external information detection unit;
an image reduction unit reducing the image based on the reduced size of the image derived in the reduced image size determination unit; and
an image recognition unit including a plurality of recognition process units, each of which recognizes a different image size, and executing the recognition process of the target to be recognized included in the image reduced in the image reduction unit by means of the recognition process unit corresponding to a size of the image.

9. The image recognition system according to claim 8, in a case where the plurality of targets to be recognized to be recognized in the image recognition unit exist, further comprising:
a recognition priority determination unit deriving priority for the recognition process of the images including the respective targets to be recognized based on the sizes and the shapes of the images detected in the external information detection unit; and
a recognition process order sort unit sending the images reduced in the image reduction unit to the image recognition unit in descending order of the priority derived by the recognition priority determination unit, wherein:
the image recognition unit executes the image recognition process of the reduced images sent from the recognition process order sort unit in descending order of the priority.

10. The image recognition system according to claim 8, further comprising:
a recognition result check unit receiving a result of image recognition by means of the image recognition unit and calculating credibility of the result of the image recognition, wherein:
in a case where the credibility calculated is lower than a threshold value, the recognition result check unit sends an image re-recognition request to the image reduction unit,
in a case where the image reduction unit receives the image re-recognition request, the image reduction unit reduces again the image before reduction into a larger size than a previous reduced size, and
the image recognition unit executes again the recognition process of the image reduced again in the image reduction unit.

11. The image recognition system according to claim 8, wherein:

the external information detection unit detects the total number of the images or the total number of the targets to be recognized included in the images as well as the size and the shape of the image, and the reduced image size determination unit derives a reduced size of the image based on the size and the shape of the image and the total number of the images or the total number of the targets to be recognized detected in the external information detection unit.

12. An image recognition system performing a recognition process of at least one target to be recognized included in an image, the image recognition system comprising:

in a case where the image is one clipped from an entire image to include the target to be recognized, an external information detection unit detecting a clip position of the image from the entire image;

a reduced image size determination unit deriving a reduced size of the image based on the clip position detected in the external information detection unit;

an image reduction unit reducing the image based on the reduced size of the image derived in the reduced image size determination unit; and an image recognition unit including a plurality of recognition process units, each of which recognizes a different image size, and executing the recognition process of the target to be recognized included in the image reduced in the image reduction unit by means of the recognition process unit corresponding to a size of the image.

13. The image recognition system according to claim 12, in a case where the plurality of targets to be recognized to be recognized in the image recognition unit exist, further comprising:

a recognition priority determination unit deriving priority for the recognition process of the images including the respective targets to be recognized based on the clip positions of the images detected in the external information detection unit; and a recognition process order sort unit sending the images reduced in the image reduction unit to the image recognition unit in descending order of the priority derived by the recognition priority determination unit, wherein:

the image recognition unit executes the image recognition process of the reduced images sent from the recognition process order sort unit in descending order of the priority.

14. The image recognition system according to claim 12, further comprising:

a recognition result check unit receiving a result of image recognition by means of the image recognition unit and calculating credibility of the result of the image recognition, wherein:

in a case where the credibility calculated is lower than a threshold value, the recognition result check unit sends an image re-recognition request to the image reduction unit, in a case where the image reduction unit receives the image re-recognition request, the image reduction unit reduces again the image before reduction into a larger size than a previous reduced size, and the image recognition unit executes again the recognition process of the image reduced again in the image reduction unit.

15. The image recognition system according to claim 12, wherein:

the external information detection unit detects the total number of the images or the total number of the targets to be recognized included in the images as well as the clip position of the image, and the reduced image size determination unit derives a reduced size of the image based on the clip position of the image and the total number of the images or the total number of the targets to be recognized detected in the external information detection unit.

\* \* \* \* \*